United States Patent
Ka et al.

(10) Patent No.: US 10,564,675 B2
(45) Date of Patent: Feb. 18, 2020

(54) MOBILE TERMINAL AND CONTROL METHOD THEREFOR

(71) Applicant: LG ELECTRONICS INC., Seoul (KR)

(72) Inventors: Hokyung Ka, Seoul (KR); Chul Park, Seoul (KR); Jaedong Kim, Seoul (KR); Kyoungho Lee, Seoul (KR); Jinho Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 250 days.

(21) Appl. No.: 15/307,348

(22) PCT Filed: Mar. 26, 2015

(86) PCT No.: PCT/KR2015/003012
§ 371 (c)(1),
(2) Date: Oct. 27, 2016

(87) PCT Pub. No.: WO2015/167128
PCT Pub. Date: Nov. 5, 2015

(65) Prior Publication Data
US 2017/0052566 A1      Feb. 23, 2017

Related U.S. Application Data

(60) Provisional application No. 61/986,411, filed on Apr. 30, 2014.

(30) Foreign Application Priority Data

Oct. 30, 2014  (KR) .................. 10-2014-0149432
Mar. 16, 2015  (KR) .................. 10-2015-0036114

(51) Int. Cl.
*G06F 3/048*   (2013.01)
*G06F 1/16*    (2006.01)
(Continued)

(52) U.S. Cl.
CPC .......... *G06F 1/1652* (2013.01); *G06F 1/1616* (2013.01); *G06F 1/1641* (2013.01);
(Continued)

(58) Field of Classification Search
None
See application file for complete search history.

(56) References Cited

U.S. PATENT DOCUMENTS 9,927,840 B2 *   3/2018   Tamaki .................. G06F 1/1643
2005/0162511 A1 *  7/2005  Jackson .................. G06T 15/02
                                            348/61

(Continued)

FOREIGN PATENT DOCUMENTS

JP    2012-029093    2/2012
KR    10-2011-0133861   12/2011
(Continued)

OTHER PUBLICATIONS

PCT International Application No. PCT/KR2015/003012, International Search Report dated Jun. 23, 2015, 4 pages.

(Continued)

*Primary Examiner* — Hua Lu
(74) *Attorney, Agent, or Firm* — Lee, Hong, DeGerman, Kang & Waimey

(57) ABSTRACT

A mobile terminal includes a display unit disposed on a front surface and including a first portion and a second portion formed to be rotatable with respect to a boundary portion formed on one side of the first portion so as to be in a state in which the second portion covers the first portion or a state in which the second portion does not cover the first portion, a first sensing unit disposed on a left end of the terminal body and generating a first signal on the basis of a movement of the left end, a second sensing unit disposed on the right end of the terminal body and generating a second signal on (Continued)

the basis of a movement of the right end, and a controller controlling at least one of functions executable on the terminal on the basis of the first signal and the second signal.

30 Claims, 42 Drawing Sheets

(51) Int. Cl.
*G09G 3/20* (2006.01)
*G06F 3/0483* (2013.01)
*H04M 1/02* (2006.01)
*G06F 3/041* (2006.01)
*G06F 3/0488* (2013.01)
*G06F 3/14* (2006.01)
*G06F 3/16* (2006.01)

(52) U.S. Cl.
CPC .......... *G06F 1/1677* (2013.01); *G06F 1/1686* (2013.01); *G06F 1/1688* (2013.01); *G06F 1/1694* (2013.01); *G06F 3/0412* (2013.01); *G06F 3/0416* (2013.01); *G06F 3/0483* (2013.01); *G06F 3/04883* (2013.01); *G06F 3/1423* (2013.01); *G06F 3/165* (2013.01); *G09G 3/20* (2013.01); *G09G 3/2003* (2013.01); *H04M 1/0268* (2013.01); *G06F 2203/04101* (2013.01); *G06F 2203/04102* (2013.01); *G06F 2203/04105* (2013.01); *G09G 2300/023* (2013.01); *G09G 2370/10* (2013.01); *G09G 2370/16* (2013.01); *G09G 2380/02* (2013.01)

(56) References Cited

U.S. PATENT DOCUMENTS

| | | | | |
|---|---|---|---|---|
| 2007/0198948 A1* | 8/2007 | Toriyama | ............. | A63F 13/005 715/790 |
| 2009/0312063 A1* | 12/2009 | Soto Nicolas | ...... | H04M 1/0268 455/566 |
| 2010/0011291 A1* | 1/2010 | Nurmi | ................... | G06F 3/0414 715/702 |
| 2010/0064244 A1* | 3/2010 | Kilpatrick, II | ........ | G06F 1/1616 715/773 |
| 2010/0081475 A1* | 4/2010 | Chiang | ................. | G06F 3/0483 455/564 |
| 2010/0085274 A1* | 4/2010 | Kilpatrick, II | ........ | G06F 1/1616 345/1.3 |
| 2010/0117975 A1* | 5/2010 | Cho | ...................... | G06F 1/1626 345/173 |
| 2010/0302015 A1* | 12/2010 | Kipman | .................. | G06F 3/011 340/407.1 |
| 2010/0302179 A1* | 12/2010 | Ahn | ...................... | G06F 1/1618 345/173 |
| 2011/0109567 A1* | 5/2011 | Kim | ...................... | G06F 1/1641 345/173 |
| 2012/0092363 A1* | 4/2012 | Kim | ........................ | G06T 5/006 345/618 |
| 2012/0235894 A1* | 9/2012 | Phillips | .................... | G09G 3/36 345/156 |
| 2012/0244910 A1* | 9/2012 | Hsu | ........................ | G03B 21/10 455/566 |
| 2013/0038759 A1* | 2/2013 | Jo | ......................... | H04N 5/2256 348/240.99 |
| 2013/0077803 A1* | 3/2013 | Konno | ................... | H04R 1/323 381/107 |
| 2013/0272557 A1* | 10/2013 | Ozcan | ................... | G06F 1/1637 381/333 |
| 2013/0321264 A1* | 12/2013 | Park | ........................ | G06F 3/01 345/156 |
| 2014/0015743 A1* | 1/2014 | Seo | ........................ | G06F 1/1694 345/156 |
| 2014/0054438 A1* | 2/2014 | Yun | ........................ | G06F 1/1652 248/550 |
| 2014/0055429 A1* | 2/2014 | Kwon | .................... | G09G 3/001 345/204 |
| 2014/0071043 A1* | 3/2014 | Jung | ........................ | G06F 3/03 345/156 |
| 2014/0135117 A1* | 5/2014 | Abe | ........................ | A63F 13/06 463/31 |
| 2014/0232743 A1* | 8/2014 | Na | .......................... | G09G 5/377 345/629 |
| 2014/0241551 A1* | 8/2014 | Kim | ........................ | H04R 1/02 381/306 |
| 2015/0222880 A1* | 8/2015 | Choi | ...................... | G03B 37/04 348/43 |
| 2015/0227173 A1* | 8/2015 | Hwang | ................. | G06F 1/1652 345/619 |
| 2015/0277854 A1* | 10/2015 | Zhang | .................... | G06F 1/1652 345/156 |
| 2018/0059717 A1* | 3/2018 | Kim | ...................... | G06F 3/0488 |

FOREIGN PATENT DOCUMENTS

| | | |
|---|---|---|
| KR | 10-2013-0098050 | 9/2013 |
| KR | 10-2014-0025931 | 3/2014 |

OTHER PUBLICATIONS

Korean Intellectual Property Office Application No. 10-2014-0149432, Notice of Allowance dated Mar. 22, 2016, 3 pages.
Korean Intellectual Property Office Application No. 10-2015-0036114, Notice of Allowance dated May 30, 2016, 2 pages.
Korean Intellectual Property Office Application No. 10-2014-0149432, Office Action dated Oct. 30, 2015, 5 pages.
Korean Intellectual Property Office Application No. 10-2015-0036114, Office Action dated Dec. 1, 2015, 6 pages.

* cited by examiner

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2015/003012, filed on Mar. 26, 2015, which claims the benefit of earlier filing date and right of priority to Korean Application Nos. 10-2014-0149432, filed on Oct. 30, 2014, and 10-2015-0036114, filed on Mar. 16, 2015, and also claims the benefit of U.S. Provisional Application No. 61/986,411, filed on Apr. 30, 2014, the contents of which are all hereby incorporated by reference herein in their entirety.

TECHNICAL FIELD

The present disclosure relates to a mobile terminal having a bendable display unit and a method for controlling the same.

BACKGROUND ART

A mobile terminal refers to every device which has a battery and a display unit, outputs information on a display unit using power supplied from the battery, and is formed to be carried around by a user. The mobile terminal includes a device for recording and reproducing (or playing) video and a device displaying a graphic user interface (GUI), and includes a notebook computer, a mobile phone, glasses and a watch capable of displaying screen information, and a game machine.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Efforts are ongoing to support and increase the functionality of mobile terminals. Such efforts include software and hardware improvements, as well as changes and improvements in the structural components.

Mobile terminals have evolved to have various designs, and in order to meet user's needs for various new designs, efforts to develop mobile terminal in a new form have been made. A new form includes structural alteration and improvement for users to more conveniently use mobile terminals. As such a structural alteration and improvement, mobile terminals in which at least a portion of a display unit is bowable or bendable have come to prominence.

As mobile terminals in which at least a portion of a display unit is bowable or bendable have come to prominence, the necessity for a user-friendly user interface using such characteristics has emerged. That is, a new user interface area which has been limited in use or impossible to use may be created on the basis of the characteristics of the bowable or bendable mobile terminals.

DISCLOSURE

Technical Problem

An aspect of the present disclosure is to solve the above-mentioned problems or any other problems.

Another aspect of the present disclosure is to provide a mobile terminal having a body in a new form using characteristics of a bowable or bendable flexible display unit.

Another aspect of the present disclosure is to provide a mobile terminal in which a display unit forming a single plane is bent such that different portions of the display unit are deformed to be folded, and a degree of bending and a rate of bending are accurately sensed, and a control method thereof.

Another aspect of the present disclosure is to provide a method for easily controlling an output direction of a sound output from a speaker using characteristics of a flexible display unit.

Another aspect of the present disclosure is to provide a method for transferring a sound to a specific person even without a separate earphone.

Technical Solution

According to an aspect, a mobile terminal includes: a terminal body having a front surface, a rear surface, and a side surface, and flexibly formed such that a least a portion thereof is foldable; a display unit disposed on the front surface and including a first portion, and a second portion formed to be rotatable with respect to a boundary portion formed on one side of the first portion so as to be in a state in which the second portion covers the first portion or a state in which the second portion does not cover the first portion; a first sensing unit disposed on a left end of the terminal body and generating a first signal on the basis of a movement of the left end; a second sensing unit disposed on the right end of the terminal body and generating a second signal on the basis of a movement of the right end; and a controller controlling at least one of functions executable on the terminal on the basis of the first signal and the second signal.

Advantageous Effects

Effects of the mobile terminal and the control method thereof according to the present disclosure are follows.

According to at least one of embodiments of the present disclosure, the first and second sensing units are respectively disposed at one end and the other end of the terminal body to generate a first signal corresponding to a movement of one end and a second signal corresponding to a movement of the other end, and the mobile terminal may accurately measure a degree to which the display unit is bent and a rate at which the display unit is bent using the first and second signals.

The first portion and the second portion of the display unit are bent with respect to one boundary portion, and here, since there is no need to install a separate device to sense curvature of the one boundary portion, it is advantageous in terms of design. In detail, a display unit having a single plane may be provided, and the display unit may be more flexibly bent such that the first and second portions are folded each other with respect to the one boundary portion.

Also, according to at least one of embodiments of the present disclosure, various control commands for changing an operational state of the terminal may be input by using an operation of folding or unfolding the flexible display or a touch input with respect to a specific region, while maintaining a current display state, providing user convenience.

In the present disclosure, an output direction of a sound of a directional speaker may be determined by utilizing bending characteristics of the flexible display unit. Thus, in the present disclosure, a sound may be transferred only to a specific person. In addition, transfer of a sound to someone else, other than a specific person, may be prevented.

Also, an output direction of a sound may be simply controlled by utilizing bending characteristics of the flexible display unit, even without performing controlling to change a position of the directional speaker.

BEST MODES

Figure 1:
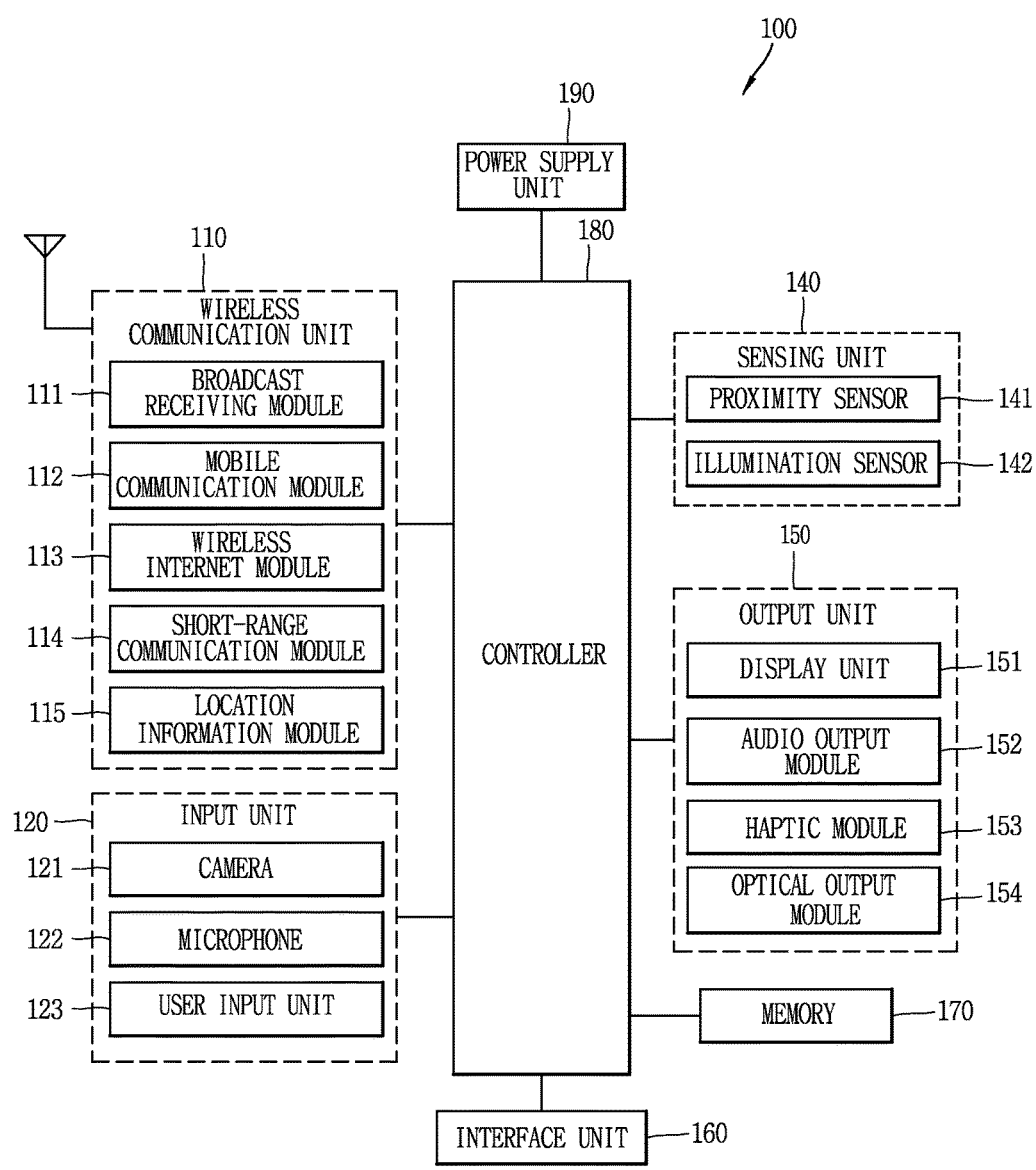
FIG. 1 is a block diagram of a mobile terminal related to the present disclosure.

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings. In the following description, explanations will be made in order in the clockwise direction based on the drawing in a right upper side.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 10:
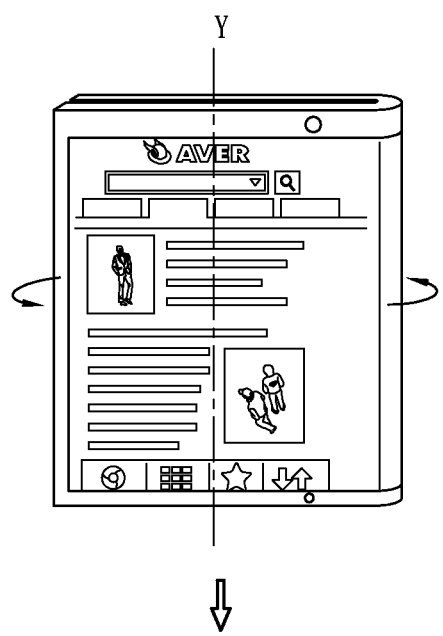
Figure 10:
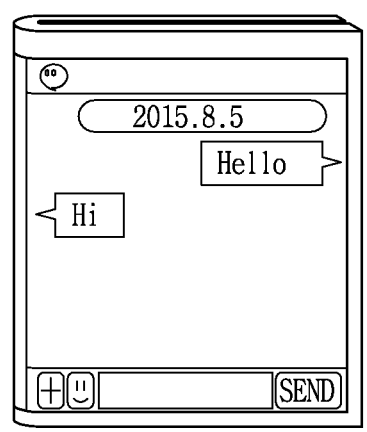

FIG. 1 is a block diagram of a mobile terminal in accordance with the present disclosure, and FIGS. 1B and 10 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The electromagnetic wave generator 130 generates electromagnetic waves having rectilinear propagation as a trigger signal for controlling an external device positioned at a short distance. Specifically, the electromagnetic wave generator 130 generates electromagnetic waves having a specific frequency under the control of the controller 180. That is, electromagnetic waves generated by the electromagnetic wave generator 130 may have various frequencies under the control of the controller 1800. The electromagnetic waves may include various data for controlling an external device. Specifically, the electromagnetic waves may include a request message for requesting information related to an external device and an identifier for security.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor provided at the display unit 151 may be configured to sense touch input in an activated state and a deactivated state, using different methods. The different methods may be associated with an activation period of the touch sensor. More specifically, the touch sensor may be activated with a different period according to an activated state or a deactivated state of the display unit 151. That is, the touch sensor may sense a touch input applied thereon, with a different activation period, according to an activated state or a deactivated state of the display unit 151.

For instance, in a deactivated state of the display unit 151, the touch sensor may be activated with a preset period. In this case, the preset period may be a time period more than 0. On the other hand, in an activated state of the display unit 151, the touch sensor may be always operated in an activated state. In this case, an activation period of the touch sensor may be a time period of 0 or very close to 0.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. On the other hand, if a power consumption amount of the touch sensor exceeds the preset value based on '0', it may be determined that the touch sensor is in an activated state.

If the display unit 151 is in an activated state (hereinafter, will be referred to as an active mode), the touch sensor may wait for a touch input to the display unit 151, while maintaining an activated state. On the other hand, if the display unit 151 is in a deactivated state (hereinafter, will be referred to as a doze mode), the touch sensor may be activated at preset periods.

When the preset activation period of the touch sensor is shorter, a sensing speed with respect to a touch input applied onto the display unit 151 is higher. However, in this case, a power consumption amount of the touch sensor may be increased. On the other hand, when the preset activation period of the touch sensor is longer, a sensing speed with respect to a touch input applied onto the display unit 151 may be lower, while a power consumption amount of the touch sensor is decreased.

Thus, the preset period may be set so that a sensing speed with respect to taps (touch input) applied onto the display unit 151 can be high enough not to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

In a doze mode where the display unit 151 is in a deactivated state and the touch sensor is periodically activated, if a preset touch input (first and second touch inputs consecutively applied onto a predetermined region within a reference time, e.g., a 'knock-knock' touch input) is sensed by the touch sensor, the controller 180 may convert the doze mode into an activate mode where the display unit and the touch sensor are activated.

Moreover, the touch sensor may be driven at a different period according to a state of the display unit 151. For instance, the touch sensor may execute a doze mode when the display unit 151 is in a closed state, and execute an active mode when the display unit 151 is converted from a closed state to an open state.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The camera includes at least one of a first camera 121a formed on a front side of the main body of the mobile terminal and a second camera 121b formed on a rear side of the main body of the mobile terminal.

The first camera 121a processes an image frame of a still image or a video obtained by an image sensor in an image capture mode or a video call mode. The processed image frame may be displayed on the display unit 151 and stored in the memory 170.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash (not shown) is shown adjacent to the second camera 121b. When an image of a subject is captured with the camera 121b, the flash (not shown) may illuminate the subject.

An electronic wave generating unit (not shown) may be disposed to be adjacent to the second camera 121b. When the second camera 121b is activated, the electronic wave generating unit (not shown) radiates generated electromagnetic waves.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

The audio output unit 152 may include at least one of a first audio output unit 152a and a second audio output unit 152b. The first audio output unit 152a may be implemented as a receiver transmitting a call sound to a user's ear and the second audio output unit 152b may be implemented as a loud spear outputting various alarm sound or a reproduced sound of multimedia.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Various embodiments described herein may be implemented in a computer-readable medium, a machine-readable medium, or similar medium using, for example, software, hardware, or any combination thereof.

FIGS. 2A to 2E are conceptual views of a mobile terminal related to the present disclosure viewed in different directions.

Figure 2A:
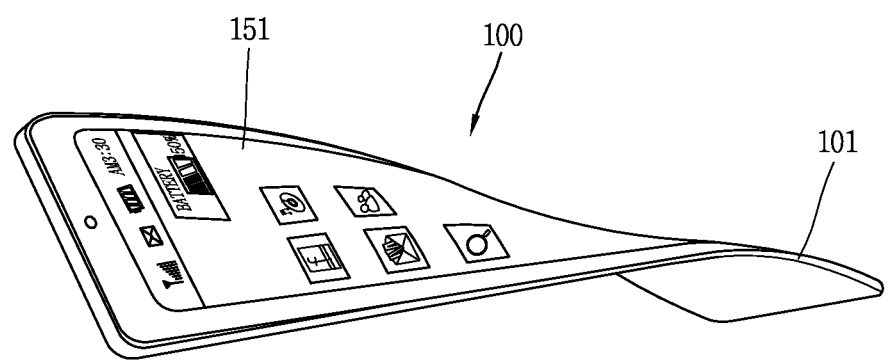
FIGS. 2A to 2E are conceptual views of one example of the mobile terminal, viewed from different directions.

Referring now to FIG. 2A, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The case 101 may be configured to be transformable together with the flexible display unit 151 by an external force, taking into account characteristics of the flexible display unit 151. That is, the flexible display unit 151 is formed to be bendable or foldable together with the case 101.

For instance, the case 101 may be formed of a transformable material such as plastic, thin glass, fiber, thin metal (e.g., aluminum, etc.), textile and silicon, or a combination thereof.

The case 101 may be partially formed of a dielectric material or a low conductive material, and at least part of a structure of the case 101 may be formed of metal.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed. Meanwhile, an opening exposing the camera 121 or the audio output unit 152 outwardly may be provided on the rear cover.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, an audio output unit 152, an optical output unit 154, a second camera 121, and a microphone 122.

Figure 2B:
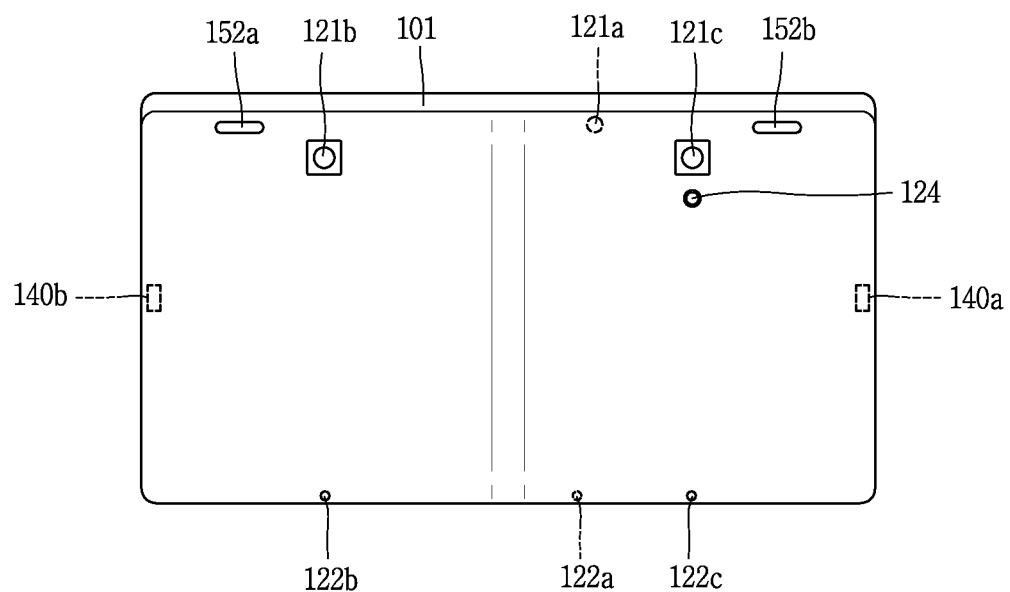

Hereinafter, as illustrated in FIGS. 2A and 2B, an example of the mobile terminal 100 in which the display unit 151 is displayed on a front surface of the body of the mobile terminal and the camera 121, the audio output unit 152, the microphone 122, the rear input units 123a and 123b, and the optical output unit 154 are disposed on the rear surface of the body of the mobile terminal will be described. However, these components are not limited to the disposition. These components may be excluded or replaced or may be disposed on other surfaces.

As illustrated in FIG. 2A, the display unit 151 may be disposed on the front surface of the mobile terminal 100. The display unit 151 displays (outputs) information processed in the mobile terminal 100. For example, the display unit 151 may display execution screen information of an application program driven in the mobile terminal 100 or a user interface (UI) or graphic user interface (GUI) information according to the execution screen information.

The display unit 151 may include a liquid crystal display (LCD), a thin film transistor-liquid crystal display (TFT-LCD), an organic light emitting diode (OLED), a 3-dimensional (3D) display, and an e-ink display.

Meanwhile, the display unit 151 may be configured to be deformable by an external force. The deformation may be at least one of bowing, bending, folding, twisting, and rolling. The deformable display unit 151 may be referred to as a "flexible display unit" or a "bendable display unit". Here, the flexible display unit may include a general flexible display, e-paper, and a combination thereof. That is, the flexible display unit refers to a display unit in which at least a portion is formed to be flexible so as to be bendable.

The general flexible display refers to a solid display manufactured on a thin, pliable substrate which is bowable, bendable, foldable, and twistable, or rollable, so as to be light and not easily brittle.

Also, the e-paper, based on a display technology employing features of a general ink, may be different from an existing flat panel display in that it uses reflected light. In e-paper, information may be changed using electrophoresis using a twist ball or a capsule.

In a state in which the display unit 151 is not deformed (for example, a state in which the display unit 151 has an infinite radius of curvature, which is referred to as a "first state", hereinafter), a display region of the display unit 151 is flat. In a state in which the display unit 151 in the first state is deformed by an external force (for example, a state in which the display unit 151 has a finite radius of curvature, which will be referred to as a "second state", hereinafter), the display region may be curved. As illustrated, information displayed in the second state may be visual information output on the curved surface. The visual information is implemented as light emission of unit pixels (or subpixels) disposed in a matrix form is independently controlled. The subpixel refers to a minimum unit for implementing a single color.

The display unit 151 may be placed in a bent state (for example, a vertically or horizontally bent state), rather than in the flat first state. In this case, when an external force is applied to the display unit 151, the display unit 151 may be deformed to a flat state (or a less bent state) or more bent state.

The display unit 151 may be formed of materials of several layers. For example, the display unit 151 may be combined with a touch sensor to implement a touch screen. When a touch is applied to the touch screen, the controller 180 (please refer to FIG. 1) may perform controlling corresponding to the touch input. The touch screen may be configured to sense a touch input even in the second state as well as in the first state. The touch sensor may be disposed on a substrate of the display or within the display.

In this manner, the display unit 151 may form a touch screen together with the touch sensor, and in this case, the touch screen may serve as a user input unit 123 (please refer to FIG. 1A).

Meanwhile, the display unit 151 is not deformed only limitedly by an external force. For example, when the display unit 151 in the first state may be deformed to the second state by a command of an application or the user. In detail, the mobile terminal 100 may have a driving unit (not shown) and correspond to a preset condition, the display unit 151 may be deformed from the first state to the second state according to driving of the driving unit, rather than an external force.

The mobile terminal 100 according to an exemplary embodiment may have a deformation sensing unit for sensing deformation of the display unit 151. The deformation sensing unit may be included in the sensing unit 140 (please refer to FIG. 1).

The deformation sensing unit may be provided in the display unit 151 or the case 101 to sense information related to deformation of the display unit 151. For example, the deformation sensing unit may include a first sensing unit 140a disposed on a left end of the main body and a second sensing unit 140b disposed on a right end of the main body. The first sensing unit 140a may generate a first signal corresponding to a movement of the left end and the second sensing unit 140 may generate a second signal corresponding to a movement of the right end. The deformation sensing unit or the controller 180 may sense information related to deformation of the display unit 151 using the first and second signals.

Here, the information related to deformation may include a direction in which the display unit 151 is deformed, a degree to which the display unit 151 is deformed, a deformed position of the display unit 151, a deformation rate, a deformation time, acceleration at which the deformed display unit 151 is restored, and the like, and may also include various types of information that can be sensed as the display unit 151 is bent.

Also, on the basis of the information related to deformation of the display unit 151 sensed by the deformation sensing unit, the controller 180 may change information displayed on the display unit 151 or generate a control signal for controlling a function of the mobile terminal 100.

For example, in a case in which the display unit 151 is bent according to an external physical force, the controller 180 may re-align, separate or combine a screen image previously displayed on the display unit 151, or change music according to a direction in which the display unit 151 is bent, an angle at which the display unit 151 is bent, and return acceleration to return to the original state. In detail, when the display unit 151 is inwardly bent by an external physical force, the controller 180 may display a screen image displayed on the display unit 151 to be close to each other. Or, conversely, when the display unit 151 is outwardly bent by an external physical force, the controller 180 may display the screen image displayed on the display unit 151 to be spaced apart from each other.

The deformation sensing unit will be described in detail with reference to FIGS. 3A to 5C hereinafter.

Meanwhile, the mobile terminal 100 according to the modified example may include a case 201 accommodating the display unit 151. The case 1101 may be configured to be deformable together with the display unit 151 by an external force in consideration of characteristics of the display unit 151. That is, the display unit 151 is formed to be bent together with the case 101.

For example, the case 101 may be formed of a deformable material such as plastic, thin glass, a fabric component, a thin metal (for example, aluminum, or the like), a textile material, or silicon, or combinations thereof.

Meanwhile, a portion of the case 101 may be formed of a dielectric material or a low-conductive material, and the case 101 or at least a portion of a structure forming the case 101 may be formed of a metal element.

Although not shown, the user input unit 123 may be provided on the rear surface of the case 101 of the mobile terminal. The user input unit 123 may be operated to receive a command for controlling an operation of the mobile terminal 100, and input content may be variously set. For example, a command such as ON/OFF of power, start, end, scroll, and the like, adjustment of a volume of a sound output from the audio output unit 152, or switching to a touch recognition mode of the display unit 151 may be received. A rear input unit may be implemented in such a form that a touch input, a push input, or an input based on combinations thereof is input thereto.

The user input unit 123 may be disposed to overlap the display unit 151 of the front surface in a thickness direction of the terminal body. Also, the user input unit 123 may be disposed in a position adjacent to left and right ends of the case 101. Thus, in a state in which the case 101 is flat without being bent, the user input unit 123 may be positioned on the rear surface of the mobile terminal 100, and when the case 101 is bent such that left and right ends thereof face each other, the user input unit 123 may be positioned on the front surface of the mobile terminal 100. However, the present disclosure is not limited thereto and the position of the user input unit and the number of the user input units may be changed.

Meanwhile, a fingerprint recognition sensor for recognizing a user's fingerprint may be provided in the mobile terminal 100, and the controller 180 may use fingerprint information sensed through the fingerprint recognition sensor as an authentication unit. The fingerprint recognition sensor may be installed in the display unit 151 or the user input unit 123.

The microphone 122 is configured to receive a user's voice or any other sound. The microphone 122 may be provided in a plurality of areas to receive a stereoscopic sound.

One or more rear cameras 121b and 121c may be disposed on the rear surface of the body of the mobile terminal. When the front camera 121 is disposed on the front surface of the body of the mobile terminal, one or more rear cameras 121b and 121c may have a direction substantially opposite to the front camera 121a.

The front camera 121a may be disposed in an opening formed in a portion of the display unit 151. Also, the front camera 121a may be disposed in an opening formed in a portion of the case disposed on the front surface.

The one or more rear cameras 121b and 121c process an image frame of a still image or video obtained by an image sensor in an image capture mode or a video call mode. The processed image frame may be displayed on the display unit 151 and stored in the memory 170.

The one or more rear cameras 121b and 121c may include a plurality of lenses arranged in a least one line. The plurality of lenses may be arranged in a matrix form. The camera may be referred to as an "array camera". When the camera 121 is configured as an array camera, it may capture an image in various manners using a plurality of lenses, and may obtain an image of better quality.

The flash 124 may be disposed to be adjacent to the one or more rear cameras 121b and 121c. The flash 124 may emit light toward a subject when the subject is imaged using the rear camera.

Although not shown, an electromagnetic wave generating unit (not shown) may be disposed to be adjacent to the rear camera. The electromagnetic wave generating unit radiates generated electromagnetic waves when the rear camera is activated.

At least one antenna for wireless communication may be provided in the body of the mobile terminal. The antenna may be installed in the body of the mobile terminal or may be formed in the case. For example, the antenna forming a portion of the broadcast receiving module 111 (please refer to FIG. 1A) may be configured to be drawn out from the body of the mobile terminal. Or, the antenna may be formed as a film type antenna so as to be attached to an inner surface of the rear cover or a case including a conductive material may be configured to serve as an antenna.

When an event occurs, the optical output unit 154 is configured to output light to indicate the occurrence of the event. Examples of the event may include a message reception, a call signal reception, an absent call, alarm, schedule notification, an e-mail reception, reception of information through an application, and the like. When user's checking of the event is sensed, the controller 180 may control the optical output unit 154 to terminate outputting of light.

In addition, a battery (not shown) provided in the mobile terminal may also be configured to be deformable together with the display unit 151 by an external force in consideration of characteristics of a battery (not shown) or the display unit 151 provided in the mobile terminal 100. In order to implement the battery, a stack and folding scheme in which battery cells are piled upwardly may be applied.

Although not shown, an interface unit 160 (please refer to FIG. 1) may be disposed on the side surface of the mobile terminal. The interface unit 160 serves as a passage for connecting the mobile terminal 100 to an external device. For example, the interface unit 160 may be at least one of a connection terminal for connection to another device (for example, an earphone or an external speaker), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

A battery (not shown) may be configured to receive power through a power cable connected to the interface unit 160. Also, the battery may be configured to be wirelessly changed through a wireless charge device. The wireless charge may be implemented according to inductive coupling or resonant magnetic coupling.

In the mobile terminal 100 according to an embodiment of the present disclosure that may include one or more of components described above, in response to bending of the display unit, the controller 180 may determine in which state the display unit 151 is placed, and may sense a change in a state of the display unit 151. Also, in response to a change in a state of the display unit 151, the controller 180 may control information output on the display unit 151. Accordingly, the information output on the display unit 151 may be determined by a state of the display unit 151.

Hereinafter, a method for controlling information displayed on the display unit 151 in relation to a structure of the display unit 151 and bending of the display unit 151 will be described in detail with reference to the accompanying drawings.

First, structural characteristics of the display unit 151 of the mobile terminal according to an embodiment of the present disclosure will be described.

Referring to the drawings, the mobile terminal 100 includes a case 101 forming an appearance, a display unit 151 disposed on a front surface, and first and second sensing units 140a and 140b sensing deformation of the display unit 151.

The display unit 151 formed to be flexible such that at least a portion thereof is foldable may be bended or folded.

Here, folding refers to a state in which a radius of curvature of a portion is maintained to be smaller than a reference value in the body of the mobile terminal, that is, a folded state. In the case of folding, a screen of the display unit contacts to face each other or may be positioned to be close to each other.

Bending refers to a state in which a radius of curvature of a portion is maintained to be larger than the reference value in the body of the mobile terminal, that is, a bent state.

Folding and bending may be differentiated according to a bending degree. For example, when the display unit is bent at an angle greater than a predetermined angle, it is defined as folding, and when the display unit is bent at an angle smaller than the predetermined angle, it is defined as bending. Also, even though the display unit is bent at an angle greater than the predetermined angle, if a radius of curvature is greater than the reference value, it may be defined as bending.

Hereinafter, for the purposes of description, bending and folding will be generally referred to as bending.

The body of the mobile terminal, that is, at least one of the display unit 151 and the case 101, may have at least one bending region 210, and the body of the mobile terminal may rotated based on the bending region 210 as an axis, so as to be simultaneously bent. For example, a left end of the body of the mobile terminal may be rotated in a first arrow direction 200a on the basis of the bending region 210 as an axis so as to be bent or deformed. In another example, a right end of the body of the mobile terminal may be rotated in a second arrow direction 200b on the basis of the bending region 210 as an axis so as to be bent or deformed.

The bending region 2210 may be defined as a virtual vertical line and/or horizontal line connecting points in which resistance values greater than a reference resistance value are detected among bent points.

The bending region may be set in a predetermined region of the entire region of the body of the mobile terminal. That is, the user may bend the body of the mobile terminal on the basis of a preset bending region as an axis.

The bending region may is a display region disposed between a first portion A and a second portion B, and a portion thereof may overlap the first portion A and the other portion thereof may overlap the second portion B. Alternatively, the display region may be divided into the first portion A, the second portion B, and the bending region. When divided, the first portion A, the second portion B, and the bending region are regions in which different types of information are displayed, and here, the first portion A, the second portion B, and the bending region may have different types of GUIs so as to be divided.

Meanwhile, the bending region may be variously formed by an external force to bend the body of the mobile terminal, rather than being previously set. In detail, the bending region is formed by an external force in a certain position in a horizontal direction and/or vertical direction of the mobile terminal, and the body of the mobile terminal may be bent with respect to the bending region formed by the external force. That is, the bending region may be varied according to a force applied from the outside.

The display unit 151 includes the first portion A and the second portion B divided by the bending region 210. In detail, the display unit 151 may include the first portion A and the second portion B rotatably formed with respect to the bending region 210 formed on one side of the first portion A to implement a state of covering the first portion A and a state of not covering the first portion A.

At least one of positions and sizes of the first portion A and the second portion B may be varied according to a position in which the bending region 210 is formed. Hereinafter, for the purposes of description, the mobile terminal according to the present disclosure will be described in detail using an example in which the bending region 210 is formed in the middle of the display unit 151 such that the first portion A and the second portion B are bilaterally symmetrical.

Meanwhile, a state of the main body of the mobile terminal may be defined in various states according to an included angle formed by the first portion A and the second portion B.

Figure 2C:
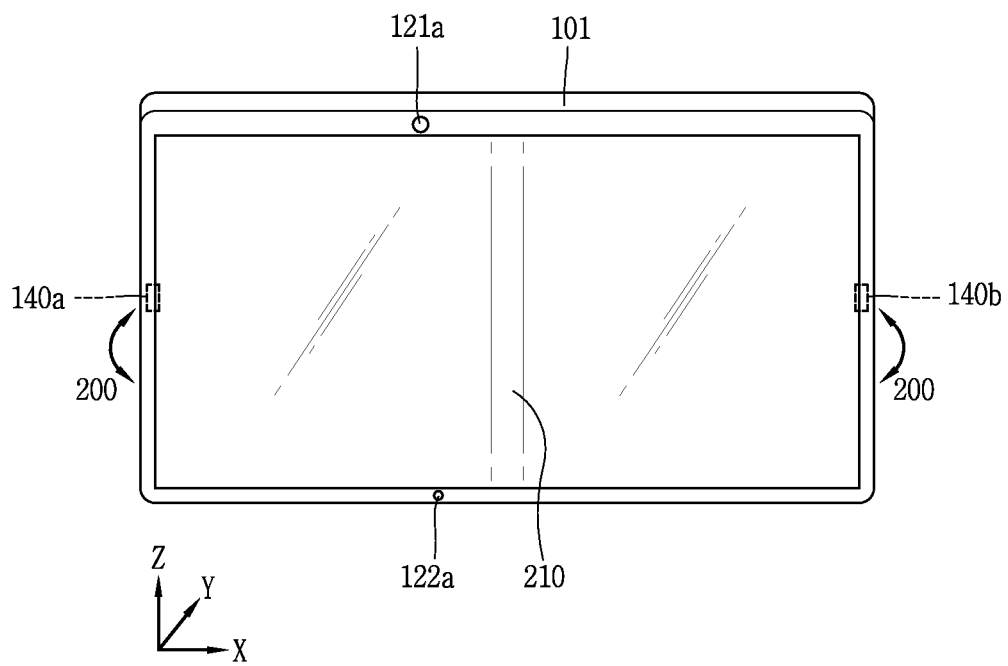

For example, as illustrated in FIG. 2C, a state in which the display unit 151 is not bent and the first portion A and the second portion B form a plane may be defined as a "planar state". The entire region of the display unit may be exposed outwardly to perform displaying and driven as a large screen.

Figure 2D:
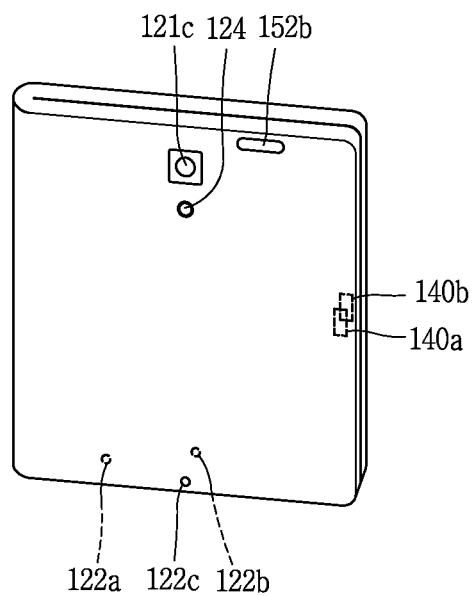

In another example, as illustrated in FIG. 2D, a state in which the first portion A and the second portion B are folded (or the left end and the right end of the mobile terminal are bent to face each other) may be defined as a "closed state"). The closed state may be used to keep the mobile terminal in a pocket or a beg. In the closed state, the flexible display unit 151 may be prevented from being scratched or damaged by other object, and since a size of the mobile terminal is reduced, the mobile terminal may be easily carried.

Here, a state in which the first portion A and the second portion B are folded refers to a state in which screens of the display unit 151 are in contact with each other or are closed to each other within a reference distance.

Figure 2E:
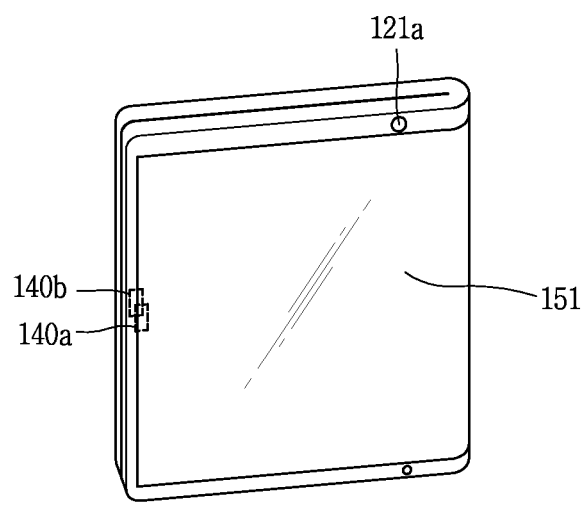

In another example, as illustrated in FIG. 2E, a state in which a portion of the rear surface is in contact (or folded) with the other remaining portion may be defined as a "divided state". In the divided state, the first portion A of the display unit is disposed on the front surface and the second portion B is disposed on the rear surface. In the divided state, although the display unit 151 is not physically divided, the controller 180 may perform controlling as if the display unit 151 is divided. For example, the first portion A, the second portion B, and the bending region may be logically divided to display different types of screen information. That is, having different types of GUIs, the first portion A and the second portion B may be divided.

That is, the mobile terminal 100 is implemented to be folded or unfolded like a notebook. Thus, the user may select a portion or the entirety of the display to display screen information by bending or folding the display unit 151 with respect to one or more bending regions by applying a force to the display unit 151. Or, the user may protect the display unit 151 from a scratch or any other damage by bending the display unit 151 to a closed state.

In addition, the controller 180 may variously differentiate a state of the mobile terminal according to a position in which the bending region is formed, a degree of bending, a direction of bending, a rate of bending, and the like. For example, when the display unit 151 is bent with respect to the bending region 210, a case in which the display unit 151 is bent in a y+ direction and a case in which the display unit 151 is bent in a y− direction may be differentiated to be different states.

Meanwhile, different functions may be executed on the basis of a state of the mobile terminal or different types of screen information may be displayed on the display unit 151. Since different functions are executed or different interfaces are provided according to a degree of bending of the display unit 151, it is important to accurately measure a degree to which the display unit 151 is bent.

Hereinafter, a method for sensing a state of the main body of the mobile terminal (or information regarding bending of the display unit 151) will be described in detail with reference to FIGS. 3A to 5C.

First, the mobile terminal according to the present disclosure may sense a change in a state of the main body or the display unit. In detail, the controller 180 may determine in which state the mobile terminal is placed using the first and second sensing units 140a and 140b. The first and second sensing units 140a and 140b may each include at least one of an acceleration sensor and a geomagnetic sensor, and sense a relative movement of a left end and a right end of the main body. For example, the controller 180 may sense that the display unit 151 is switched from a flat state to a closed state or sense that the first portion A and the second portion B of the display unit 151 are perpendicular to each other.

In another example, the sensing unit 140 may include a bend sensor (not shown) disposed either on a front surface or a rear surface of the flexible display unit 151 or disposed on both thereof to sense bending of the flexible display unit 151. Here, the bend sensor may be a sensor which is bent by itself and senses bending using characteristics that a resistance value is varied depending on a degree of bending. For example, an optical fiber bending sensor using strain of an optical fiber, a resistance type bending sensor using electrical resistance, a pressure sensor, a strain gauge, and the like, may form a bend sensor. The sensing unit 140 may calculate a resistance value of the bend sensor using a magnitude of a voltage applied to the bend sensor or a magnitude of a current flowing in the bend sensor, and sense a position in which bending has occurred, a degree of bending, and the like, on the basis of a magnitude of the calculated resistance value.

When the sensing unit 140 senses bending by the bend sensor, the controller 180 may search for a bending region on the basis of the calculated resistance value from the bend sensor, distinguish between the first and second portions A and B on the basis of a bending region, and determine a body state of the mobile terminal.

Figure 3A:
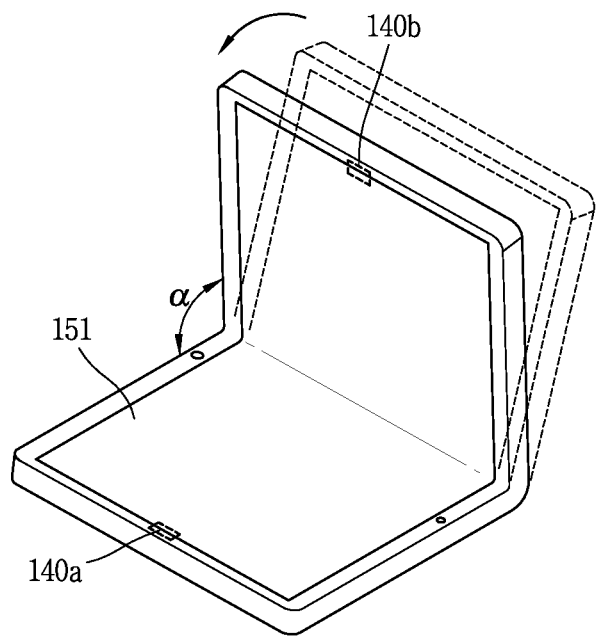
FIGS. 3A to 3C are views illustrating a method for detecting a change in a state of a display unit in a mobile terminal according to the present disclosure.
Figure 3B:
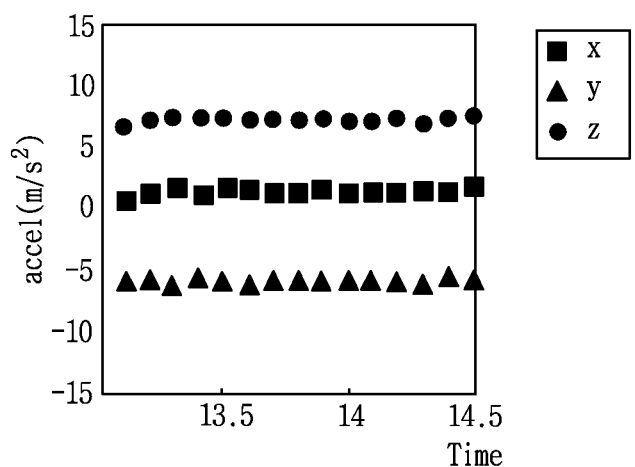
Figure 3C:
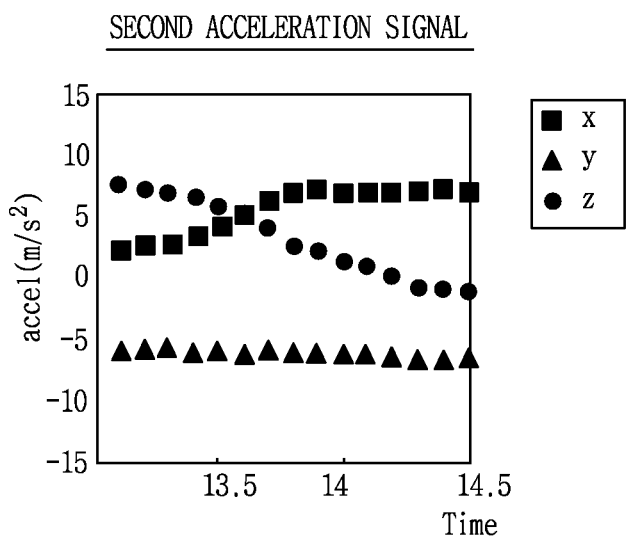

FIGS. 3A to 3C are views illustrating a method for detecting a change in a state of a display unit in a mobile terminal according to the present disclosure.

As illustrated in FIG. 3A, a first sensing unit 140a and a second sensing unit 140b are disposed respectively on the left and right with respect to a bending region of the main body of the mobile terminal 100. The first sensing unit 140a is disposed on the left end of the main body and generates a first signal corresponding to a movement of the left end, and the second sensing unit 140b is disposed on the right end of the main body and generates a second signal corresponding to a movement of the right end.

FIG. 3A illustrates an embodiment in which the right end of the main body rotates in a state in which the left end of the main body is fixed, FIG. 3B illustrates a first signal generated by the first sensing unit 140a, and FIG. 3C illustrates a second signal generated by the second sensing unit 140b in the embodiment. The first and second sensing units 140a and 140b are configured as acceleration sensors, and signals generated by the acceleration sensors include acceleration values regarding a z axis corresponding to a gravitation direction and an x axis and a y axis perpendicular to each other with respect to the z axis.

When a movement such as folding or unfolding is made, the controller 180 may measure a rate at which the main body is bent and a degree to which the main body is bent (or a degree of bending) using the first and second signals.

Here, the degree of bending may be defined as information of bending of the display unit 151 with respect to the bending region. The bending information refers to an included angle (a) formed by the first portion of the display unit 151 positioned on the left with respect to the bending region and the second portion positioned on the right with respect to the bending region.

Data variations of signals generated in the two sensing units 140a and 140b are measured to be different depending on a rate at which the main body is folded or unfolded. Using the data variations, the controller 180 may accurately calculate a bending rate and an included angle, and may also sense a change in a state of the main body or the display unit.

Figure 4A:
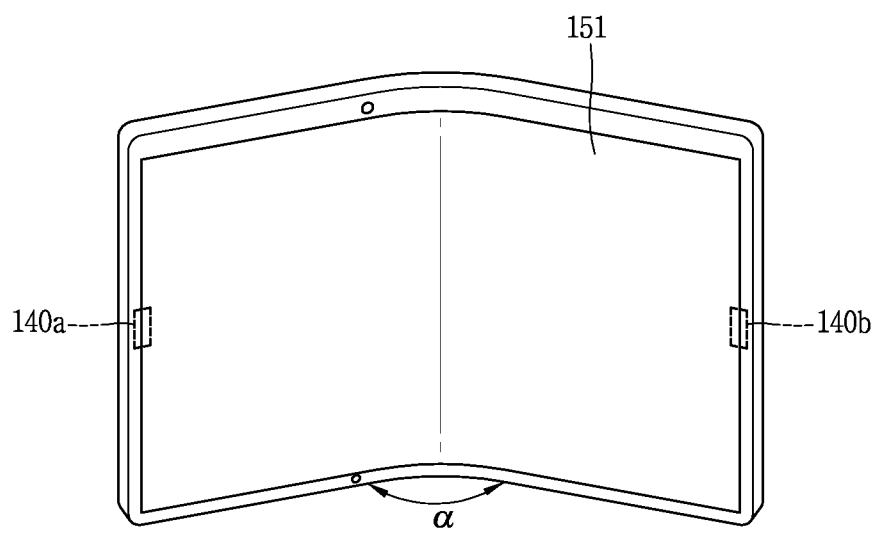
FIGS. 4A to 4C are views illustrating a method for detecting a degree of bending of a display unit in a mobile terminal according to the present disclosure.
Figure 4B:
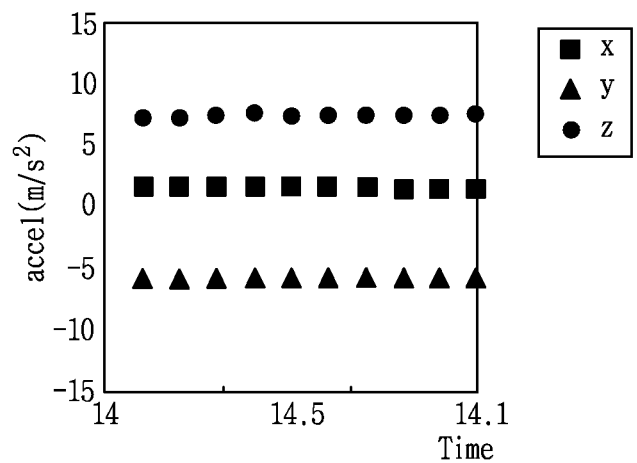
Figure 4C:
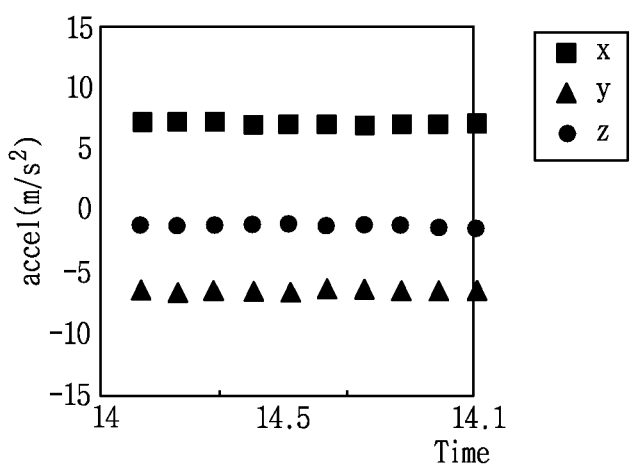

Also, even when the main body does not move, the controller 180 may calculate the included angle (a) using the first and second signals. FIGS. 4A to 4C are views illustrating a method for detecting a degree of bending of a display unit in a mobile terminal according to the present disclosure.

As illustrated in FIG. 4A, even when the mobile terminal is placed without a movement, first and second signals generated in the first and second units 140a and 140b are different depending on a bending degree as illustrated in FIGS. 4B and 4C. The controller 180 may calculate the included angle (a) using the difference in acceleration values included in the first and second signals.

Since the acceleration sensor is low in price and consumes less power, it is advantageous in design. Also, the controller 180 may be able to accurately measure a degree of bending regarding every angle at which the display unit is deformed using acceleration signals generated in different positions.

In addition, the sensing unit may further include a geomagnetic sensor, as well as the acceleration sensor. That is, the first sensing unit 140a may include a first acceleration sensor and a first geomagnetic sensor, and a first signal generated in the first sensing unit 140a may include a first acceleration signal and a first geomagnetic signal. Similarly, the second sensing unit 140b may include a second acceleration sensor and a second geomagnetic sensor.

The controller 180 may sense a state of the main body of the mobile terminal (or deformation of the display unit) in consideration of the geomagnetic signals as well as the acceleration signals collectively.

Figure 5A:
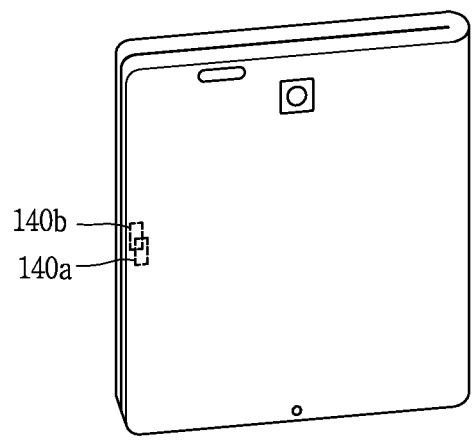
FIGS. 5A to 5C are views illustrating a method for detecting a closed/opened state of a display unit in a mobile terminal according to the present disclosure.
Figure 5B:
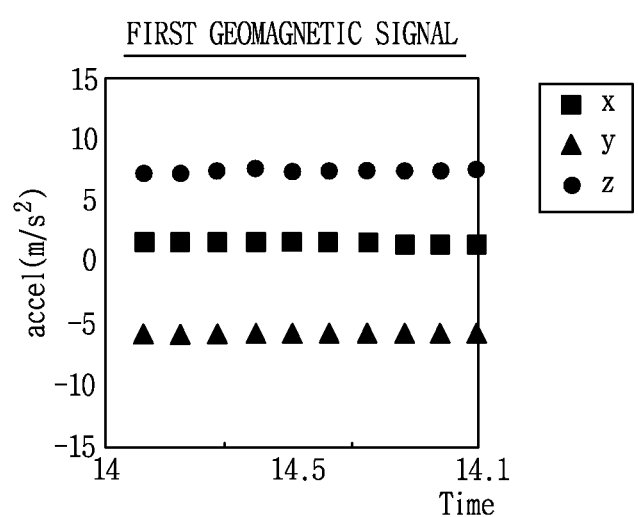
Figure 5C:
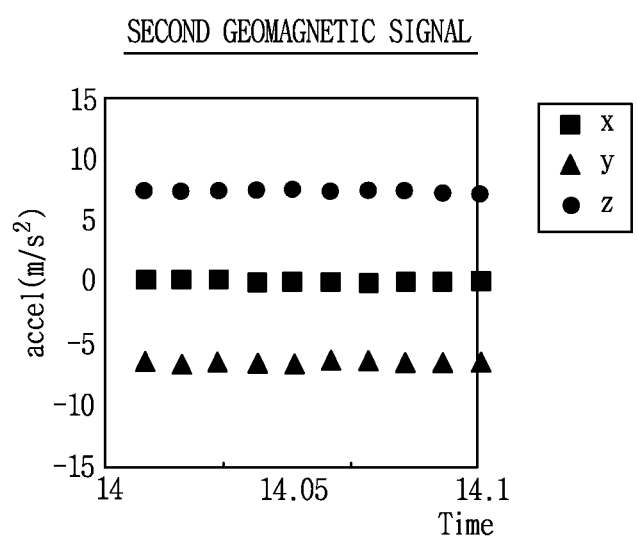

FIGS. 5A to 5C are views illustrating a method for detecting a closed/opened state of a display unit in a mobile terminal according to the present disclosure.

When the first portion A and the second portion B are folded as illustrated in FIG. 5A, the first magnetic signal and the second geomagnetic signal have the substantially same vales within a reference range. Based on such properties, the controller 180 may accurate sense whether the display unit 151 is in a closed state. That is, the controller 180 determines whether the display unit 151 is in a closed state using signals generated by the geomagnetic sensors and signals generated by the acceleration sensors, and when the display unit 151 is not in a closed state, the controller 180 may generate information related to deformation of the display unit 151 using the signals generated in the acceleration sensors.

Meanwhile, since the geomagnetic sensor sensitively react to a magnetic body positioned to be adjacent to the main body, it may not be able to provide accurate information to the user due to the magnetic body. However, the mobile terminal according to the present disclosure may measure an adjacent magnetic field using the plurality of geomagnetic sensors disposed in different positions (for example, the left end and the right end of the main body), and correct geomagnetic signals on the basis of the measured adjacent magnetic field. For example, the mobile terminal may compare an absolute value of the first geomagnetic signal and an absolute value of the second geomagnetic signal with a reference value, and determine whether to use at least one of the first and second geomagnetic signals according to the comparison result. When the absolute value is greater than the reference value, since a magnitude of an output value is large due to the magnetic body, and thus, the corresponding signal is not used. In this manner, an erroneous geomagnetic information is prevented from being provided in advance.

Figure 6A:
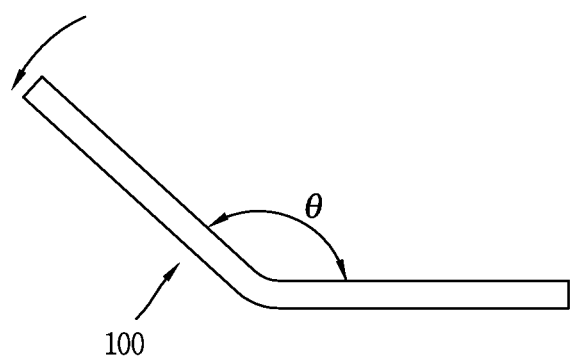
FIGS. 6A and 6B are views illustrating an angle of inclination formed due to bending in a mobile terminal according to the present disclosure.
Figure 6B:
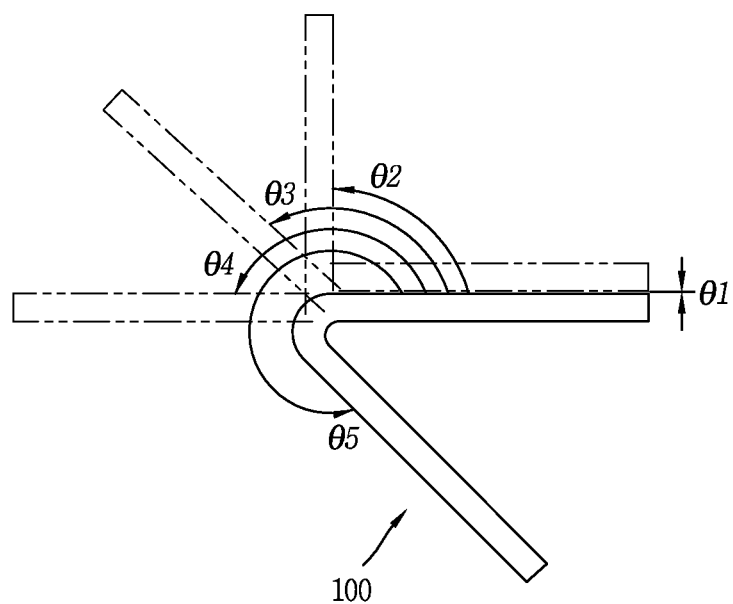

FIGS. 6A and 6B are views illustrating an angle of inclination formed due to bending in a mobile terminal according to the present disclosure.

As mentioned above, in the present invention, the "included angle" refers to an angle formed by the first portion A positioned on the left side of the display unit 151 and the second portion B positioned on the right side of the display unit with respect to the bending region. In the closed state in which the first portion A and the second portion B are folded, the included angle is defined as 0 degree, and in a divided state in which the a portion of the rear surface of the main body and the other remaining portion thereof are folded, the included angle is defined as 360 degrees. The mobile terminal according to the present disclosure may be freely deformed between 0 degree to 360 degrees.

Meanwhile, in the present disclosure, a "folding event" refers to an event that internal displays, i.e., the first portion A and the second portion B, are bent forwardly at a predetermined angle, centered on the bending region, as an external force is applied to the body covering the first portion A and the second portion B. That is, when the size of the included angle is reduced to be smaller than before due to an external force, it may be called that "a folding event has occurred". In this manner, in a case in which a folding event occurs in the bending region so an included angle is greater than 0 degree and smaller than 180 degrees, it may be said that the first portion A and the second portion B are in a folded state.

In contrast, a "bending-back event" refers to an event that the internal displays, i.e., the first portion A and the second portion B, are bent back at a predetermined angle, centered on the bending region, as an external force is applied to the body covering the first portion A and the second portion B of the display unit 151 of the terminal. That is, when a size of an included angle is greater than before due to an external force, it may be called that a "tilting event has occurred". In this manner, when the tilting event occurs so an included angle is greater than 180 degrees and smaller than 360 degrees, the first portion A and the second portion B may be said to be in a "bant-back state". When the external force is removed, the backwardly tilted state may be elastically restored to a plane state, i.e., to a state in which the first portion A and the second portion B are flat.

FIG. 6A is a view illustrating a folded state of the mobile terminal 100 by a hinge structure corresponding a bending region, for example, a click hinge, and FIG. 6B is a view illustrating a folded state of the mobile terminal 100 by a hinge structure corresponding to a bending region, for example, a free-stop hinge.

The click hinge is to implement a structure in which the mobile terminal is automatically opened or closed at a specific angle or greater, and the free stop hinge is to implement a structure in which the user is able to open the mobile terminal at a desired angle. For example, as illustrated in FIG. 5B, the user may open or close the mobile terminal at various angles θ1, θ2, θ3, and θ4.

In the present disclosure, different types of screen information may be displayed or various control functions may be executed according to a degree to which the display is folded with respect to the bending region.

Figure 7:
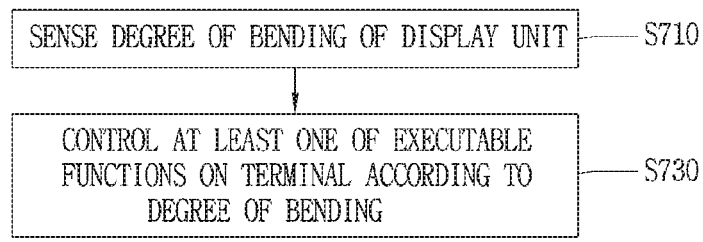
FIG. 7 is a flow chart illustrating an operation method of a mobile terminal according to the present disclosure.

FIG. 7 is a flow chart illustrating an operation method of a mobile terminal according to the present disclosure.

First, the controller 180 (please refer to FIG. 1) may sense a degree of bending of the display unit 151 (please refer to FIG. 1) using the first and second sensing units 140a and 140b (please refer to FIG. 2A).

When at least a region of the display unit is bent as a physical force is applied to the display unit or the main body, the sensing unit 140 may sense that the flexible display unit is bent. Even in a state in which an external force is applied and bending is maintained, a degree of bending may also be sensed.

Here, the bending may be performed by an external physical force applied to the flexible display unit 151, and the external physical force may be applied by the user or an object other than the user.

Next, at least one of functions that can be executed on the terminal is controlled according to a degree of bending (S730). That is, the controller 180 may execute different control functions according to a degree to which the display is folded with respect to the bending region.

Here, the function that can be executed in the terminal may refer to an type of function that can be executed or driven in the mobile terminal. For example, one of the executable functions may be an application installed in the mobile terminal. For example, "executing a certain function" may refer to "executing or driving a certain application".

In another example, a function that can be executed in the mobile terminal may be a function for generating or receiving an event. Here, the generated event may be an alarm generation event, a go-back event, an image capture event, and the like, and the receiving event may be a message reception event, a call reception event, and the like. Meanwhile, the event may be an event that occurs in an application installed in the mobile terminal.

In another example, a function that can be executed in the mobile terminal may be a function required for basic driving the mobile terminal. For example, the function for basic driving may be a function of turning on/off lighting provided in the display unit 151, a function of switching the mobile terminal from a released state to a locked state or conversely switching a locked state to a released state, a function of setting a communication network, a function of changing configuration information of the mobile terminal, and the like.

In this manner, according to the present disclosure, the controller 180 may control at least one of the functions that can be executed on the mobile terminal according to a degree of bending of the display unit.

Also, the controller 180 may output screen information according to execution of a specific function in different manners according to a degree of bending of the display unit. FIGS. 8A to 8D are conceptual views illustrating a method for outputting screen information in different manners according to a degree of bending of a display unit.

First, in a state in which the main body is opened, the controller 180 displays an execution screen in a display region. Here, the opened state refers to a state in which the display disposed on an inner surface of the terminal is partially or entirely folded and exposed to the front side. Also, the opened state may include a state in which the display is bent or bent back at a predetermined angle with respect to the bending region, as well as a case in which the display disposed on the inner surface of the terminal is unfolded to be flat.

Here, there is no limitation in screen information. For example, the screen information may be an execution screen of a specific application (for example, an application related to a Web browser, video playing, schedule management, a call, a game, music, document work, a message, banking, e-book, traffic information, a program for performing a function of updating an application, and the like, or a home screen page, a locked screen, or screen information which has been displayed before the terminal is switched to a closed state.

The screen information may be output according to different schemes according to a degree of bending of the display unit. Here, the different schemes refer to schemes in which positions, sizes, and directions of a displayed region are different.

As an example of the different schemes, a scheme in which screen information output is varied as an included angle corresponds to any one of a first reference range to a fifth reference range will be described. However, the first to fifth reference ranges are not essential in implementing the mobile terminal according to the present disclosure, and thus, screen information may be output in different manners according to fewer or greater reference ranges.

Figure 8A:
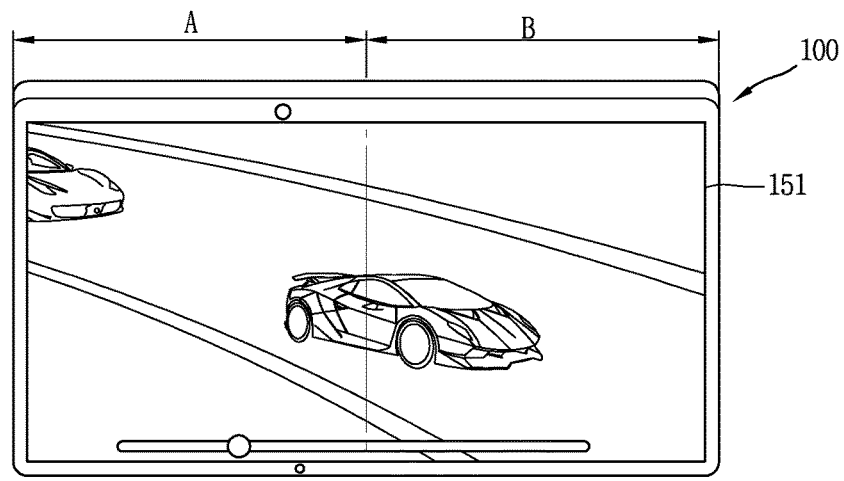
FIGS. 8A to 8D are conceptual views illustrating a method for outputting screen information in different manners according to a degree of bending of a display unit.

A degree of bending of the display unit 151, i.e., an included angle, is included in the first reference range, screen information may be displayed in the entire region including the first portion A and the second portion B. That is, as illustrated in FIG. 8A, in a case in which the display unit 151 is flat, the screen information is displayed in the entire region of the display unit 151.

In contrast, when the included angle is included in the second reference range, the controller 180 may display screen information in any one of the first portion A and the second portion B, or may divide the information included in the screen information into two groups and display the two groups in the first portion A and the second portion B, respectively.

Figure 8B:
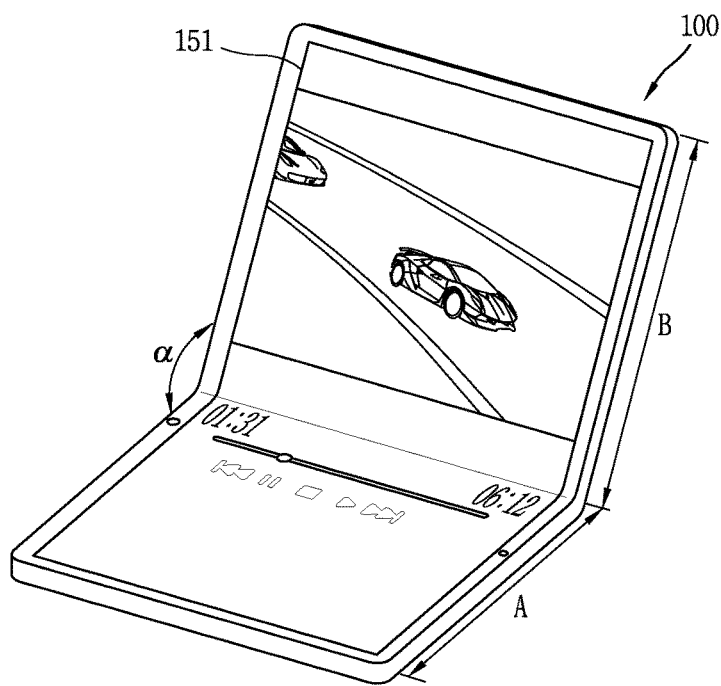
Figure 8C:
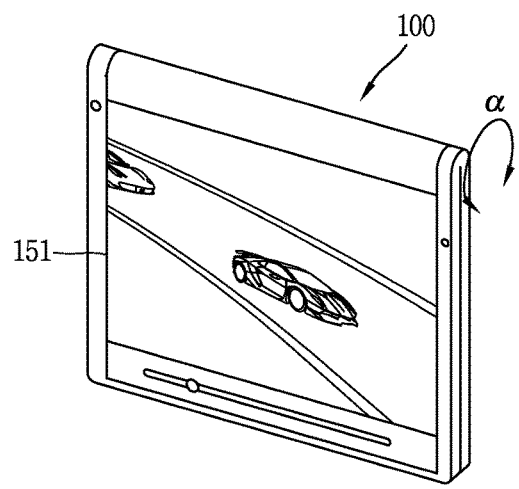

For example, when an included angle is included in a range greater than 90 degrees and smaller than 180 degrees, as illustrated in FIG. 8B, a portion of the main body is fixed to the ground, while the other remaining portion may be separated from the ground.

In this case, any one of the first portion A and the second portion B positioned to be horizontal to the ground may be deactivated in which lighting is turned off, and the other may display the screen information.

Also, when information included in the screen information may be classified into two groups and first screen information including information belonging to a first group and second screen information including information belonging to a second group may be displayed in the first portion A and the second portion B, respectively.

As illustrated in FIG. 8B, when an application related to video playing is executed, a played image and graphic objects (for example, play/pause, fast forward, rewind, volume control, a progress bar, and the like) associated with image controlling are included in an execution screen. Here, the controller 180 may generate first screen information using the image, and generate second screen information using the graphic objects. Since only an image is included in the first screen information, the entire image may be displayed without being covered by a graphic object.

In addition, when a message input window and a virtual keypad are included in the screen information, first screen information including the message input window and second screen information including the virtual keypad are generated and displayed in the first portion A and the second portion B, respectively. Thus, the user may adjust a viewing angle to be optimized according his or her posture, and an optimized interface may be provided accordingly.

Meanwhile, when the included angle is included in the third reference range, the controller 180 may display screen information in any one of the first portion A and the second portion B and switch the other to a deactivated state in which lighting is turned off. Here, the third reference range refers to a case in which an included angle is 360 degrees (or a state in which a portion of the rear surface of the main body and the other remaining portion are folded). In this case, as illustrated in FIG. 8B, in a case in which the display unit 151 is divided, screen information is displayed on any one of the first portion A and the second portion B. This is because there is user needs to reduce a size of the mobile terminal 100 according to situations.

Figure 8D:
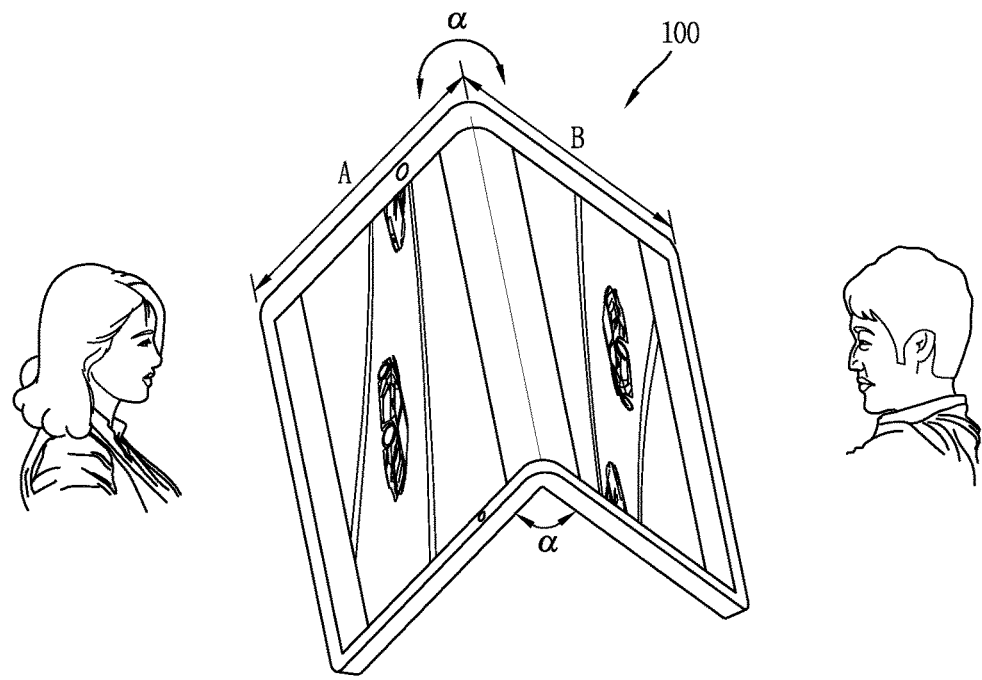

Meanwhile, when the included angle is included in the fourth reference range, the controller 180 may display the first screen and the second screen corresponding to the screen information in the first portion A and the second portion B, respectively. Here, the fourth reference range refers to a case in which an included angle is greater than 180 degrees and smaller than 360 degrees. In this case, as illustrated in FIG. 8D, the same screen information according to execution of the specific function is displayed on each of the first portion A and the second portion B, and here, the first screen displayed in the first portion A is a horizontally reversed screen of the second screen with respect to a direction in which the first portion A is oriented. This may meet user's needs that a plurality of users sitting to face each other want to view the same screen information using the single mobile terminal.

Meanwhile, when the included angle is included in the fifth reference range, displaying of the execution screen may be terminated and the activated state of the display unit in which lighting is turned on is switched to a deactivated state in which lighting is turned off. The fifth reference range refers to a case of a closed state in which the included angle is 0 degree, that is, the first portion A and the second portion B are folded. In the closed state, displaying of screen information is terminated to save battery and lighting of the display unit 151 is turned off.

Meanwhile, the controller 180 may sense a change in a state of the display unit 151 using the first and second sensing units 140a and 140b. The controller 180 may perform controlling differently on the basis of the mobile terminal and an attribute of the sensed change in state.

First, a state of the mobile terminal will be described in detail. When a tap is sensed, the controller 180 may perform controlling differently according to a state of the mobile terminal, that is, a function currently driven in the mobile terminal, a type of screen information currently displayed on the display unit 151, an application corresponding to screen information currently output on the display unit 151, an ON/OFF state of lighting of the display unit 151, and a locked/unlocked state of the mobile terminal.

In detail, although the same change in a state is sensed, when lighting of the display unit 151 is in an OFF state, the controller 180 may execute a "voice recognition function", and when lighting of the display unit 151 is in an ON state, the controller 180 may perform controlling on an application related to currently output screen information, or if the currently output screen information is a locked screen, the controller 180 may release the locked state and output a home screen page on the display unit 151.

Also, a function that can be executed to correspond to the change in the state may be changing a setting of a function currently driven on the mobile terminal, changing a setting of an application related to screen information output on the mobile terminal, or changing a setting of a function corresponding to screen information output on the mobile terminal.

Referring to an attribute of a change in a state, the controller 180 may control different functions on the basis of a type, a direction, a rate, and a pattern of a change in a state.

Hereinafter, a method for performing different functions according to a change in a state will be described with reference to the accompanying drawings.

FIGS. 9A, 9B, 9C, 10, 11, 12, and 13 are conceptual views illustrating a method for performing different functions according to a change in a state of a terminal body of a mobile terminal.

First, the controller 180 displays an execution screen according to execution of an application in at least one region of the display unit 151. While the execution screen is being displayed, when a folding event with respect to a bending region occurs, the controller 180 executes a first function related to the execution screen, and when a bending-back event occurs with respect to bending region, the controller 180 executes a second function related to the execution screen.

Here, the first and second functions may vary depending on a type of an execution screen (or a type of an application corresponding to an execution screen).

Figure 9A:
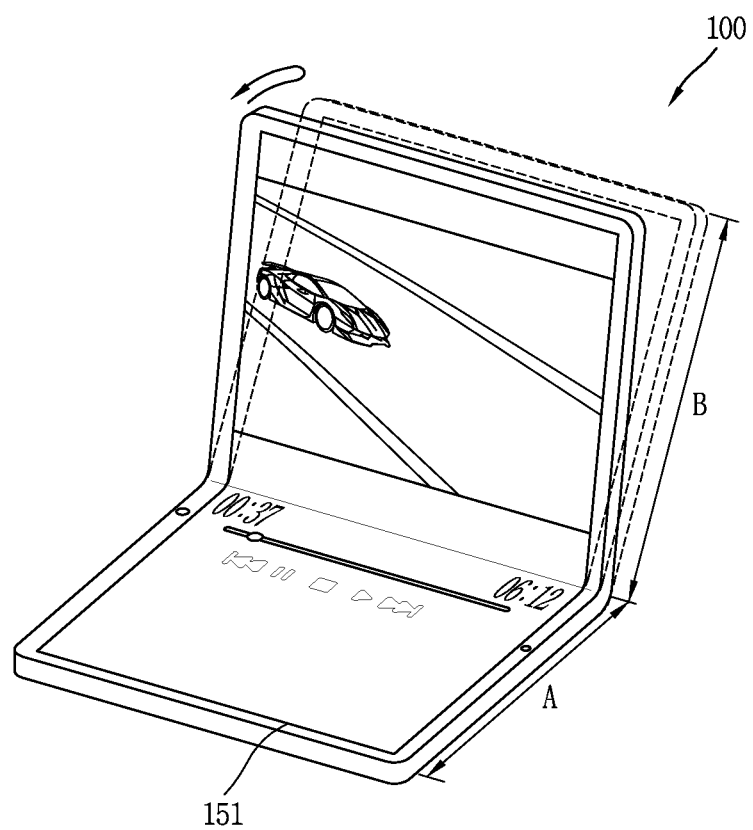
FIGS. 9A, 9B, 9C, 10, 11, 12, and 13 are conceptual views illustrating a method for performing different functions according to a change in a state of a terminal body of a mobile terminal.

For example, as illustrated in FIG. 9A, in a state in which an execution screen of a video play application is displayed on the display unit 151, when a folding event occurs, the controller 180 may execute a rewind function back to 10 seconds ago, and when the folding-back event occurs, the controller 180 may execute a fast forward function to go to 10 seconds after. In another example, in a state in which an execution screen of a gallery application is displayed on the display unit 151, when a folding event occurs, the controller 180 may execute a previous image view function, and when a folding-back event occurs, the controller 180 may execute a next image view function.

Meanwhile, when a folding-back event occurs within a reference time after occurrence of a folding event, the controller 180 may execute a third function, and when a folding-back event occurs within a reference time after the occurrence of the folding event, the controller 180 may execute a fourth function. Occurrence of the folding-back event within the reference time after the occurrence of the folding event refers to a gesture of folding the main body and returning it to the original state.

Meanwhile, when the main body is switched to a preset state in a state in which an execution screen is displayed, the controller 180 may display the execution screen on any one of the first portion A and the second portion B of the display unit and display preset screen information on the other remaining one.

Here, the preset state refers to a state in which an included angle formed by the first portion A and the second portion B is within a reference range. The reference range of the included angle may be set to 85 degrees to 95 degrees, for example, and may be variously modified according to an embodiment.

The preset screen information may be information guiding the lately executed applications or a fast execution menu or notification information, and the like.

Figure 9B:
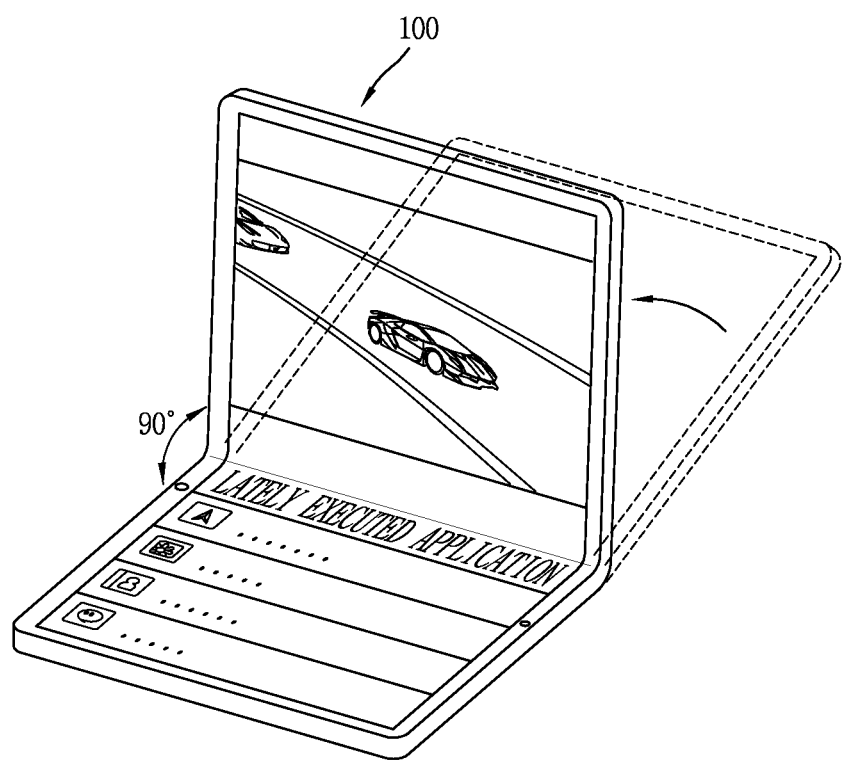
Figure 9C:
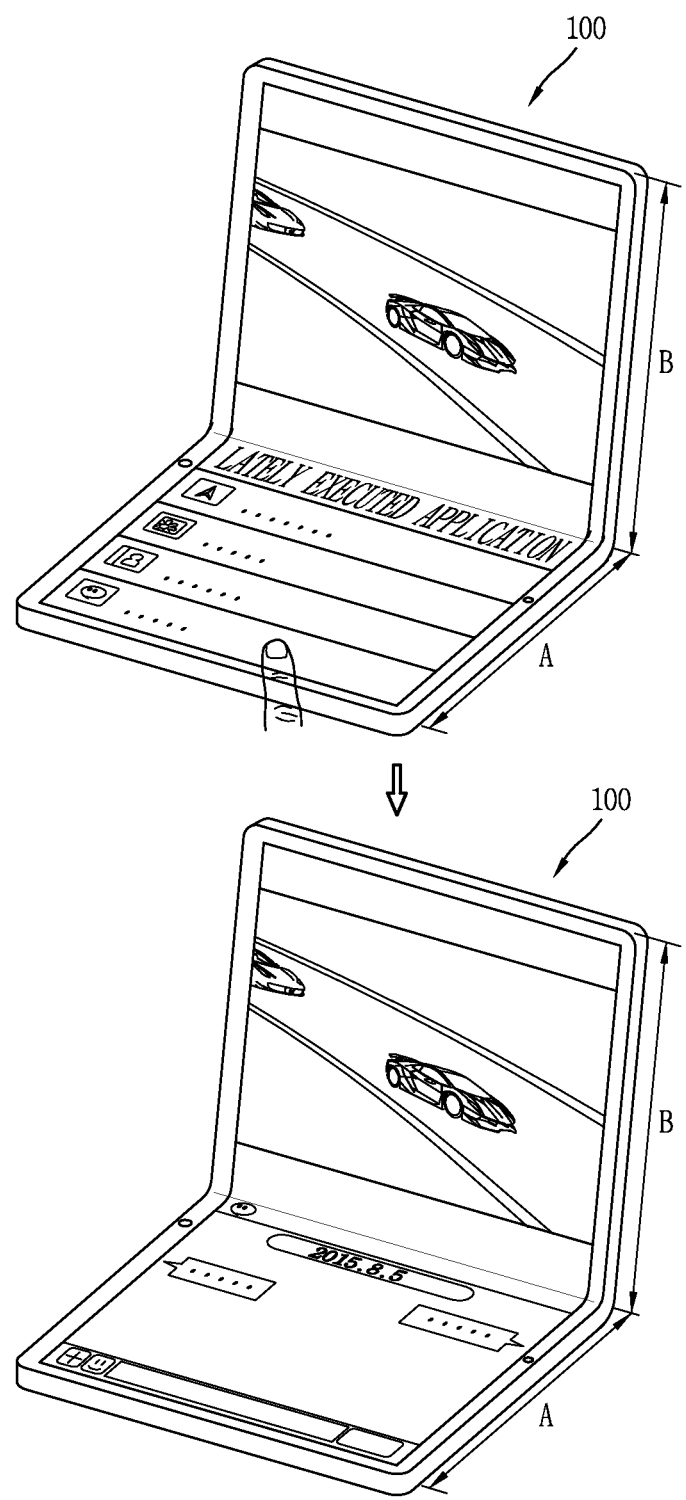

For example, as illustrated in FIG. 9B, when the mobile terminal is bent at an included angle of 90 degrees while an execution screen of a video play application is being displayed, the controller 180 may display the execution screen on any one of the first portion A and the second portion B and display screen information guiding the lately executed applications on the other.

Thereafter, the first portion A and the second portion B, as regions displaying different types of information may have a GUI in different forms. In other words, when any one of the lately executed applications is selected, the selected any one execution screen may be displayed on the other, instead of the information guiding the lately executed applications. Here, the execution screen of the video play application is continuously displayed on the any one of the first portion A and the second portion B.

Referring to FIG. 10, the mobile terminal according to the present disclosure may be switched to a divided state in which a portion of the rear surface thereof and the other remaining portion are folded. In the divided state, any one of the first portion A and the second portion B may be disposed on the front surface, the other may be disposed on the rear surface of the mobile terminal, and a bending region is disposed on a side surface. In the divided state, a horizontal size of the display unit is reduced to a half, and accordingly, the user may easily grip the main body.

Meanwhile, when the user grips the main body with one hand, an unintentional touch may be applied a portion facing the user's palm. In order to prevent this, in the mobile terminal of the present disclosure, any one of the first portion A and the second portion B may be activated and the other may be deactivated in the divided state. Since a touch applied to the deactivated one is disregarded, execution of a function by the touch is limited.

As illustrated in FIG. 10, in a state in which the first portion A faces forwardly and the second portion B faces backwardly, first screen information may be displayed in the first portion A and the second portion B may be deactivated.

Meanwhile, the first portion A may be switched to face backwardly and the second portion B may be switched to face forwardly. That is, the main body may be rotated centered on the Y axis. In this case, the controller 180 may switch the activated state to a deactivated state and switch the second portion B from the deactivated state to an activated state. Second screen information different form the first screen information is displayed on the second portion B which has been switched to an activated state.

Figure 11:
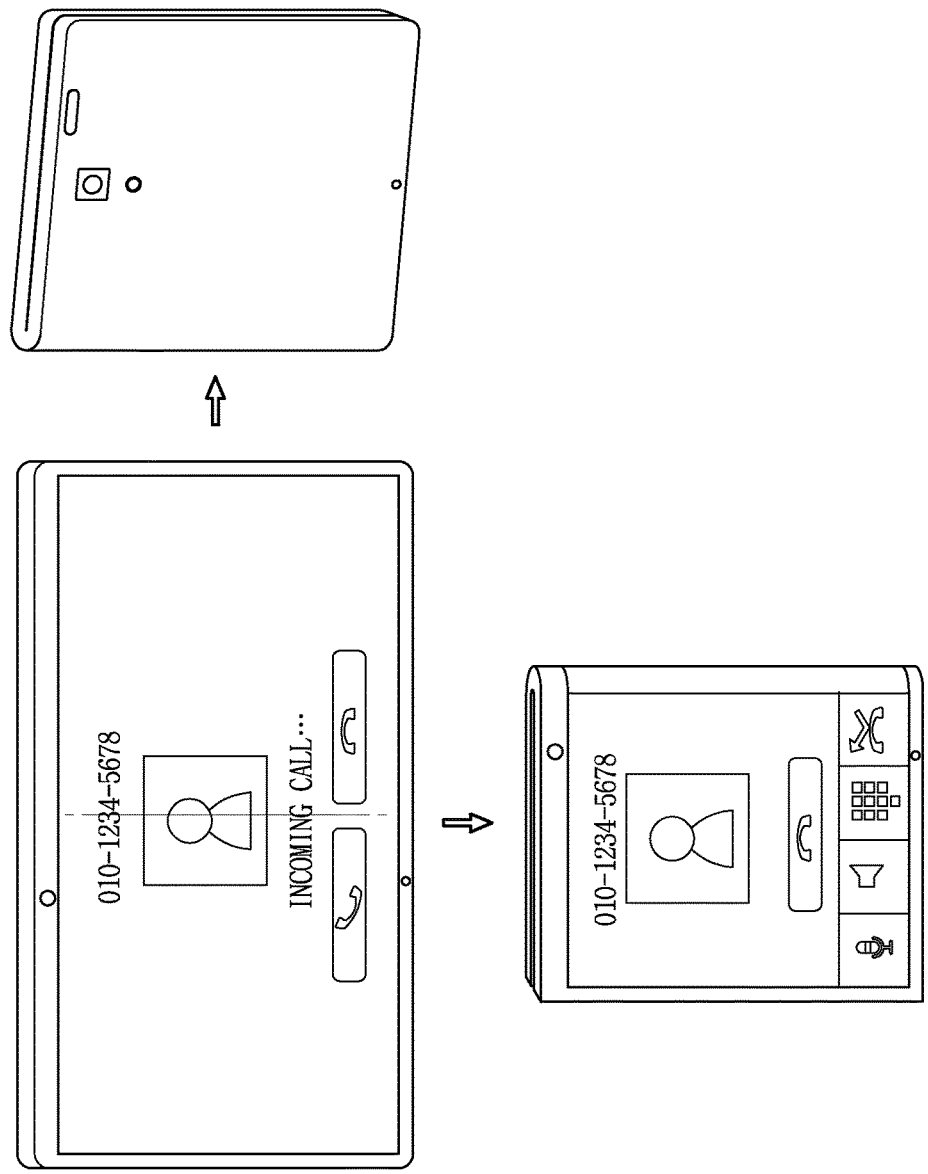

When a call reception event occurs, screen information corresponding to the event may be displayed on the display unit 151. Thereafter, in response to a change in the state of the main body, the controller 180 may connect a call or may reject call reception. In detail, as illustrated in FIG. 11, when a state of the main body is switched to a closed state, the controller 180 may reject call reception, and when the state of the main body is switched to the divided state, the controller 180 may connect a call.

When a state of the main body is switched to the closed state, even though an event occurs until the closed state is switched to a different state, notification guiding the generated event is not output. In other words, the controller 180 limits notification output regarding an event that occurs while the closed state is maintained.

When the state of the main body is switched to the divided state, the controller 180 displays screen information according to a call connection on any one of the first portion A and the second portion B, and switch the other to a deactivated. This is to prevent an unintentional touch from being applied to the other to cause malfunction.

Figure 12:
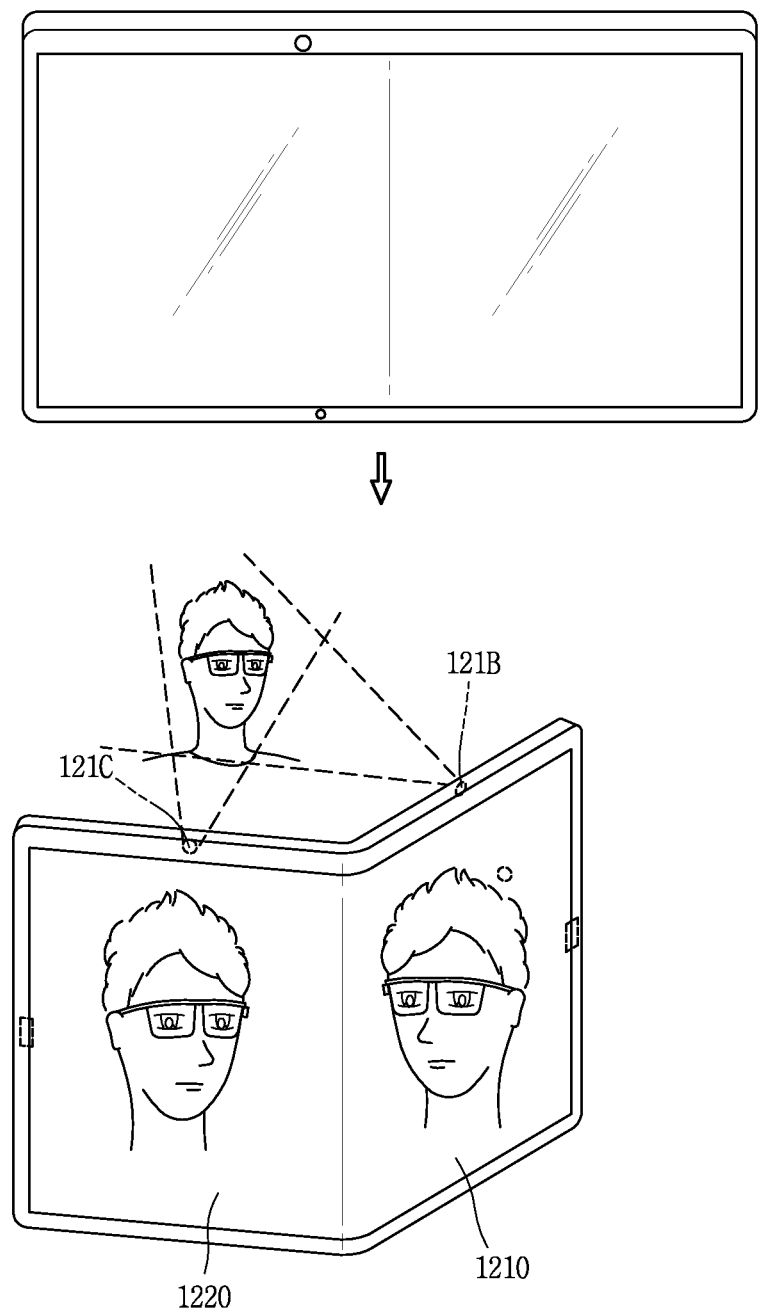

Referring to FIG. 12, the mobile terminal according to the present disclosure further includes first and second rear cameras 121b and 121c disposed on different points of the rear surface of the main body, and when the display unit 151 in a flat state is switched to a bent state with respect to a bending region, the controller 180 may activate the first and second cameras 121b and 121c.

As the first and second cameras 121*b* and 121*c* are activated, the controller may display a first preview screen 1210 captured by the first rear camera 121*b* on the second portion B and display a second preview screen 1220 captured by the second rear camera 121*c* on the first portion A.

Meanwhile, when an image capture command is received, the controller 180 may generate a first image captured by the first camera, a second image captured by the second camera, and a third image obtained by combining the first and second images. After captured, at least one of the generated first to third images may be displayed on the display unit 151 or stored in the memory 170.

Meanwhile, as the first and second rear cameras 121*b* and 121*c* are activated, the controller 180 may synthesize the first image captured by the first rear camera 121*b* and the second image captured by the second rear camera 121*c* and display the synthesized image in the entire region of the display unit 151. In this case, the synthesized image may correspond to a 3D image or a panoramic image.

The controller 180 may accurately calculate a degree of bending of the main body using the first and second sensing units 140*a* and 140*b*, the controller 180 may accurately calculate an angle at which the first and second rear cameras 121*b* and 121*c* face a subject. Thus, pixel synthesis and rendering of an overlap section when images are synthesized may be more rapidly and accurately performed.

Although not shown, the controller 180 may identify a subject included in a first image captured by the first rear camera 121*b* and included in a second image captured by the second rear camera 121*c*, and bend the display unit 151 such that focus of the first and second rear cameras 121*b* and 121*c* is formed on the identified subject.

When a plurality of subjects are identified, the controller 180 may bend the display unit 151 such that any one of the plurality of identified subjects is focused. Here, the any one subject may be selected by a user input.

Meanwhile, when a subject is not identified, the controller 180 may display notification information guiding that there is no identified subject in a region of the display unit, whereby capturing of an image not intended by the user may be prevented in advance.

Figure 13:
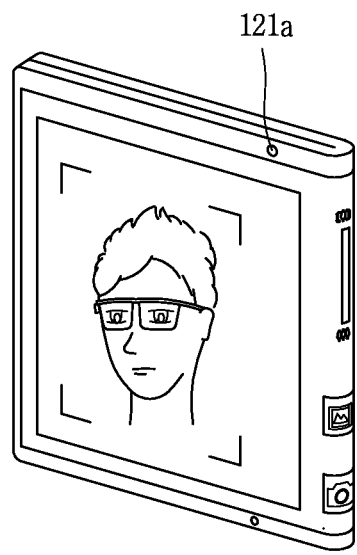

Referring to FIG. 13, a front camera 121*a* is provided on a front surface of the mobile terminal according to the present disclosure. When the front camera 121*a* is activated, the controller 180 may execute a first function or a second function on the basis of first and second signals generated in the first and second sensing units 140*a* and 140*b*.

Here, the first function is a function of displaying an image captured in the front camera 121*a* in the entire region of the display unit 151, and the second function is a function of displaying an image captured in the front camera 121*a* on each of the first portion A and the second portion B. The second function is executed in a divided state, that is, in a state in which a portion of the rear surface is folded with the other remaining portion of the rear surface.

Meanwhile, when the second function is executed, graphic objects associated with a control function of the front camera 121*a* are displayed in the bending region. The user may execute a function related to the front camera 121*a* by applying a touch to the bending region.

FIGS. 14A, 14B, 15, and 16 are conceptual views illustrating a method for providing various functions using a multi-audio input unit in a mobile terminal according to the present disclosure.

A plurality of audio input units are disposed in the mobile terminal according to the present disclosure. For example, as illustrated in FIG. 2B, a front audio input unit 122*a* disposed on the front surface and receiving audio received by the front surface and first and second rear audio input units 122*b* and 122*c* disposed at different points of the rear surface and receiving audio received by the rear surface. The first and second rear audio input units 122*b* and 122*c* may be disposed to be spaced apart from each other.

The controller 180 may recognize a direction of an object which has generated a sound by using audio received by the plurality of audio input units. In particular, in the mobile terminal according to the present disclosure, the controller 180 may calculate relative positions of the plurality of audio input units by using first and second signals generated by the first and second sensing units 140*a* and 140*b*. In other words, the controller 180 may calculate a degree of bending of the main body using the first and second signals and recognize directions in which the front and first and second rear audio input units are oriented and relative positions and angles on the basis of the calculated degree of bending. Accordingly, a time domain and/or a frequency domain of audio received by the plurality of audio input units may be more accurately measured.

Figure 14A:
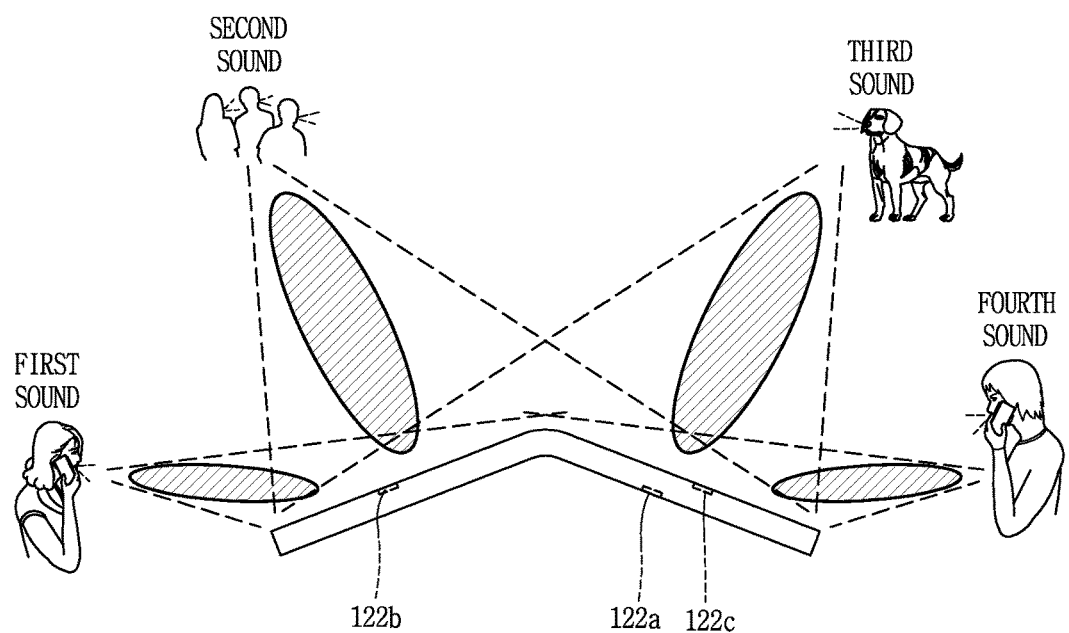
FIGS. 14A, 14B, 15, and 16 are conceptual views illustrating a method for providing various functions using a multi-audio input unit in a mobile terminal according to the present disclosure.

For example, as illustrated in FIG. 14A, audio received by the mobile terminal may include first to fourth sounds. The controller 180 may estimate directions in which the sounds are generated by using a time domain and/or a frequency domain of an audio signal received by the plurality of audio input units. Also, the controller 180 may perform control to pick up only a sound generated in a specific direction and remove or attenuate sound generated in the other remaining directions. That is, the controller 180 may select at least one sound among the first to fourth sounds and pick up only the selected sound.

Figure 14B:
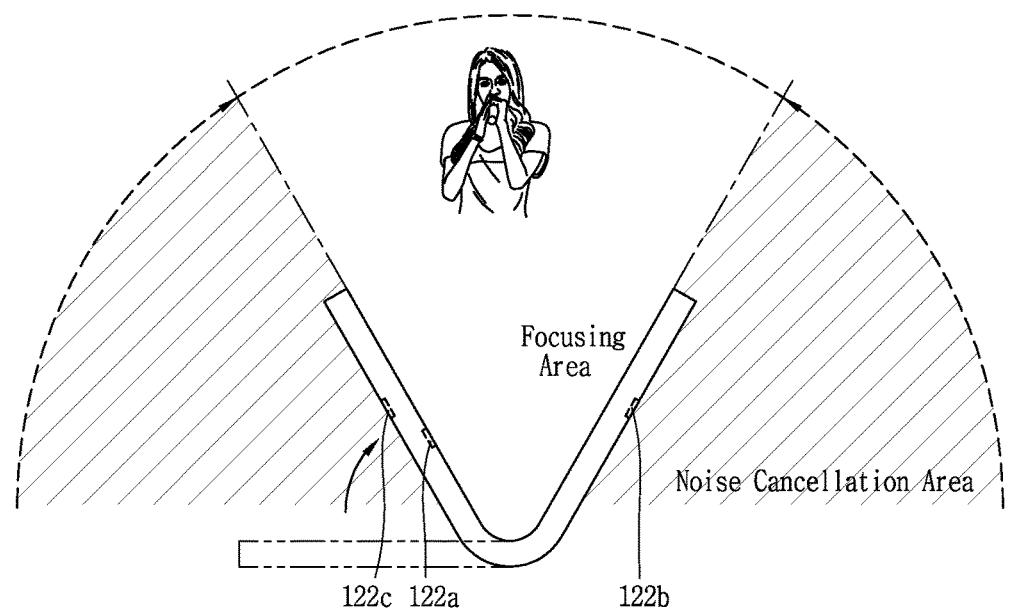

Meanwhile, when the sound desired to be picked up is selected, the controller 180 may bend the display unit in a direction in which the selected sound is generated. For example, as illustrated in FIG. 14B, when a sound desired to be picked up is selected, the controller 180 may determine a noise cancellation area and a focusing area, and bend the main body such that the plurality of audio input units may easily pick up audio generated in the focusing area. That is, the controller 180 may switch the main body to the second state on the basis of a generation direction of the sound selected in the first state.

Meanwhile, when video is recording, the controller 180 may receive an image including a transfer target of a sound by using the plurality of rear cameras 121*b* and 121*c*. Here, the first rear camera 121*b* is disposed to be oriented in the same direction as a direction in which the first rear audio input unit 121*b* is oriented, and the second rear camera 121*c* is disposed to be oriented in the same direction as a direction in which the second rear audio input unit 121*c* is oriented.

Here, the controller 180 may calculate a degree of bending of the main body using the first and second sensing units 140*a* and 140*b*, and calculate a time domain and/or frequency domain of audio received by the plurality of audio input units on the basis of the calculated degree of bending of the main body.

When a plurality of audios generated in different directions are included in a single audio signal, the controller 180 may select at least one audio on the basis of a preset condition.

Figure 15:
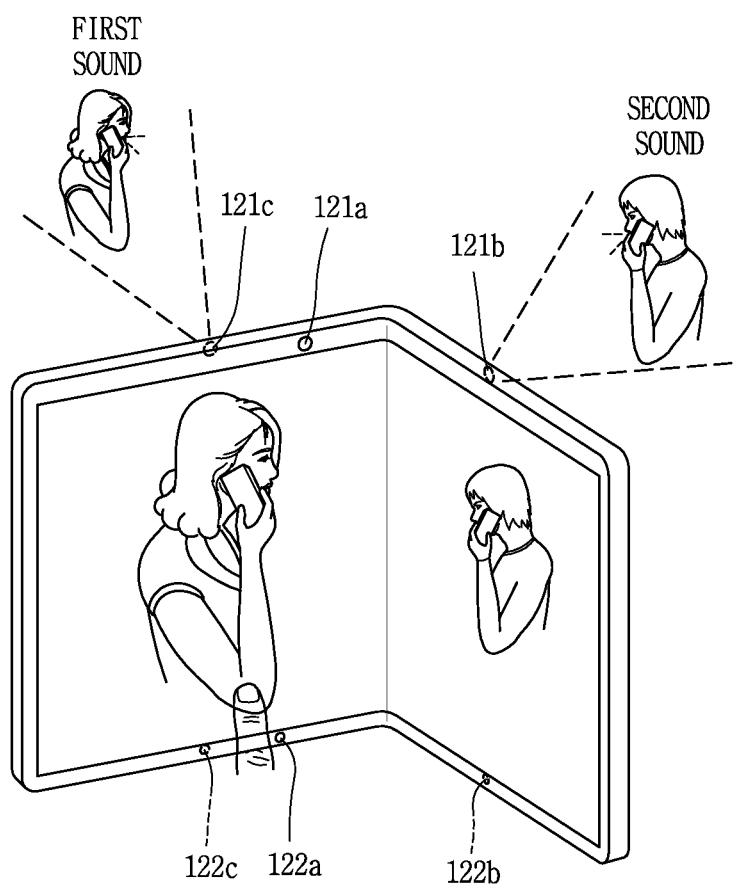

Here, the preset condition may be set in advance or may be set by the user. For example, audio characteristics of the terminal user are stored in the memory 170, and audio corresponding to the audio characteristics may be selected. In another example, as illustrated in FIG. 15, images received from cameras 121*b* and 121*c* are displayed on the display unit 151, and at least one object may be selected on the basis of a user's touch input. Also, audio corresponding to the selected object may be selected.

When audio is selected, the controller 180 may bend the main body to pick up the selected audio, or may extract the selected audio by software and attenuate the other remaining audio. Accordingly, the selected audio is highlighted in the audio information of the captured video.

Figure 16:
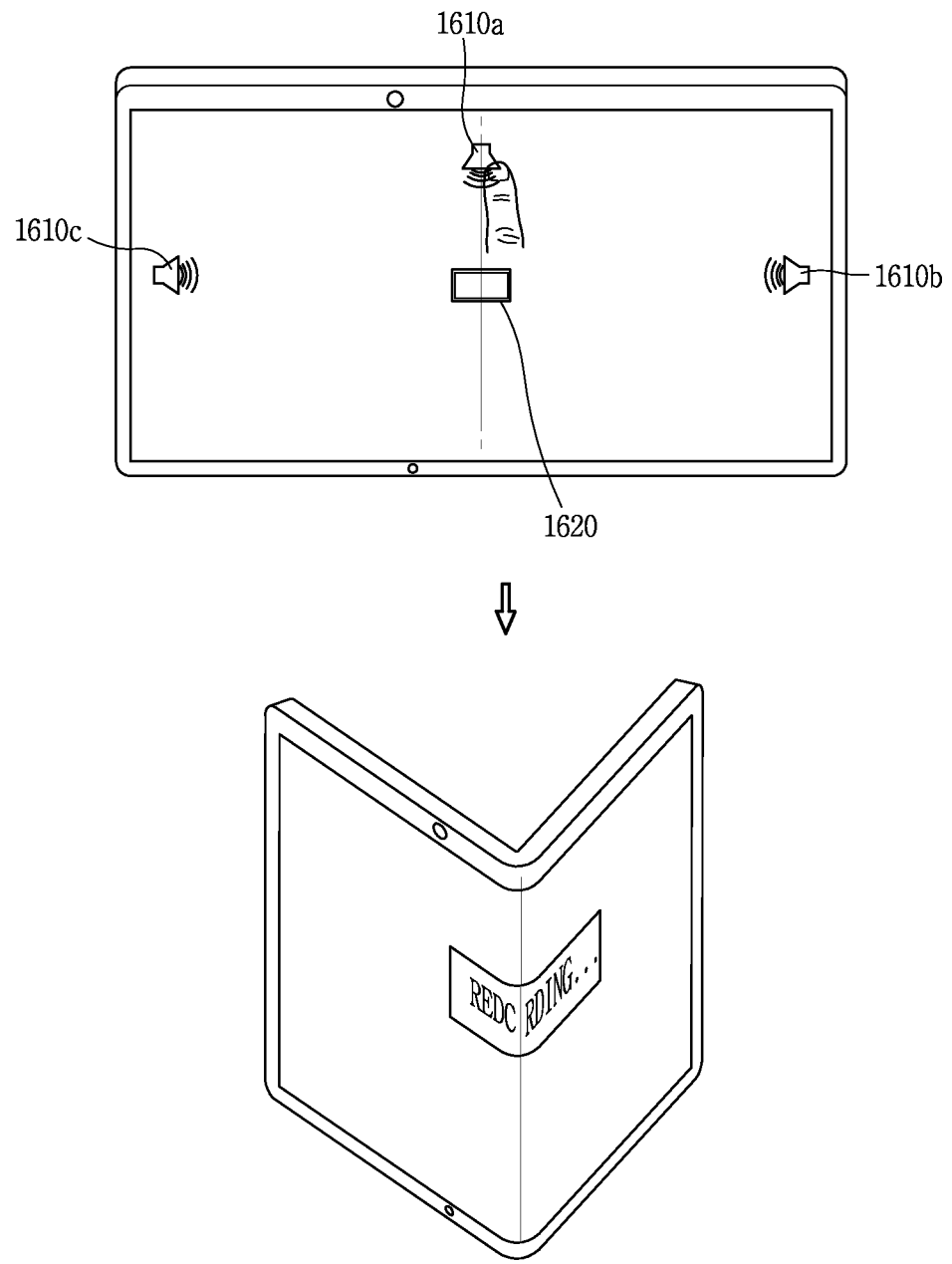

Meanwhile, when audio is recorded, the controller 180 may extract at least one audio from an audio signal, and detect a direction in which the extracted audio is generated. The controller 180 may generate guide information guiding a direction in which the extracted audio is generated on the basis of a position of the terminal. For example, as illustrated in FIG. 16, in a case in which three different audios are included in an audio signal, graphic objects 1610a to 1610c guiding directions in which respective audios are generated may be displayed on the display unit 151. A reference 1620 corresponding to the terminal is displayed at one point of the display unit 151, and the graphic objects 1610a to 1610c guiding directions in which audios are generated are displayed on the basis of the reference. When a touch input is applied to at least one of the graphic objects 1610a to 1610c, the controller 180 may select audio on the basis of the touch input and bend the display unit to pick up the selected audio.

Figure 17:
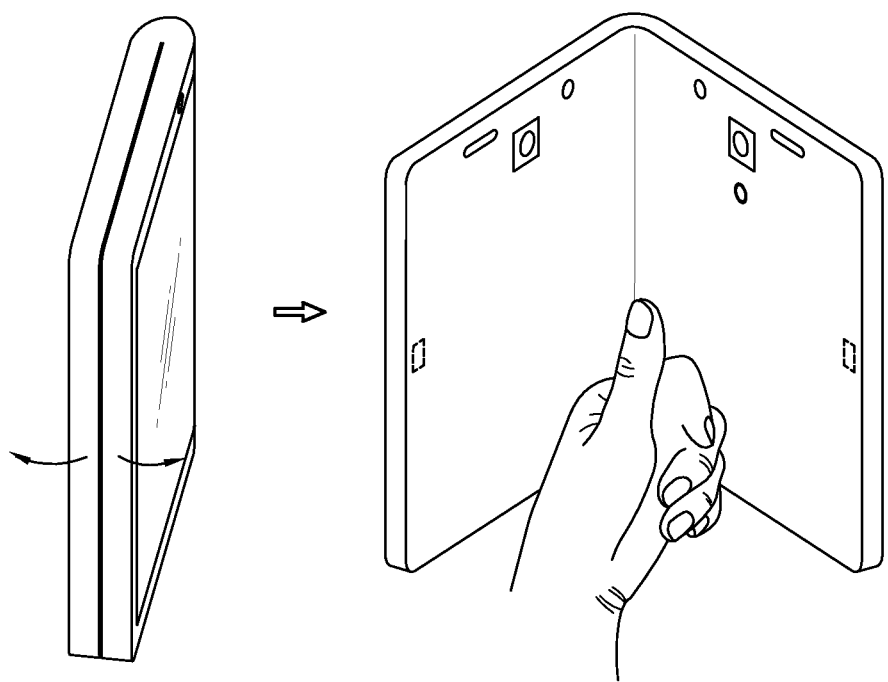
FIG. 17 is a conceptual view illustrating a method for performing a fingerprint recognition using a multi-camera in a mobile terminal according to the present disclosure.

FIG. 17 is a conceptual view illustrating a method for performing a fingerprint recognition using a multi-camera in a mobile terminal according to the present disclosure.

The mobile terminal according to the present disclosure may execute a locked state in which input of a user's control command is limited. For example, the display unit may be switched from an activated state to a deactivated state or when the main body is switched from an opened state to a closed state, the controller 180 may automatically execute a locked state. When the display unit is activated in the locked state, the controller 180 displays a lock screen formed to input a password.

Meanwhile, when a degree of bending of the display unit is changed (or when a change in a state is sensed) in a state in which the display unit is deactivated, the controller 180 may activate the display unit and display a lock screen, while maintaining the locked state. Here, the controller 180 may activate the plurality of cameras positioned on the front or rear surface of the main body and perform fingerprint recognition using images captured from a plurality of activated cameras.

For example, as illustrated in FIG. 17, when a change in a state of the main body is sensed, the controller 180 may perform fingerprint recognition using a plurality of cameras. Since the controller 180 may be able to accurately calculate an angle at which the display unit 151 is bent using the first and second signals generated in the first and second sensing units 140a and 140b, pixel synthesis and rendering of a section in which a plurality of images obtained from the plurality of cameras overlap each other may be more rapidly and accurately performed. Since finger recognition is performed in three dimensions, a larger amount of fingerprint information may be obtained, compared with performing fingerprint recognition using only a cross-sectional image, and security regarding the terminal may be further strengthened.

When fingerprint information matches, the locked state is switched to a released state and a home screen page or an execution screen of the lately executed function, instead of a lock screen, is displayed on the display unit 151. However, when the fingerprint information does not match, notification information indicating that the fingerprint information does not match is displayed.

As described above, according to the mobile terminal and the control method thereof according to an embodiment of the present disclosure, a screen output on the display may be easily changed by using an operation of folding or unfolding the flexible display, and, for example, it is possible to input personal information without being exposed to someone else by providing different information fitting a usage purpose according to a degree to which the display is bent. Also, various control commands such as changing an operational state of the terminal can be input using an operation of folding or unfolding the flexible display and a touch input applied to a specific region, while maintaining a current display state, providing user convenience.

Figure 18A:
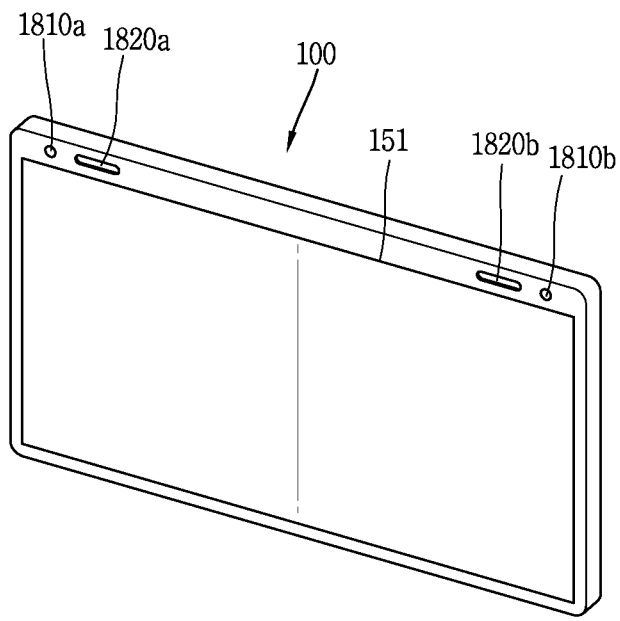
FIGS. 18A and 18B are conceptual views illustrating a camera and a speaker provided in a mobile terminal according to the present disclosure.
Figure 18B:
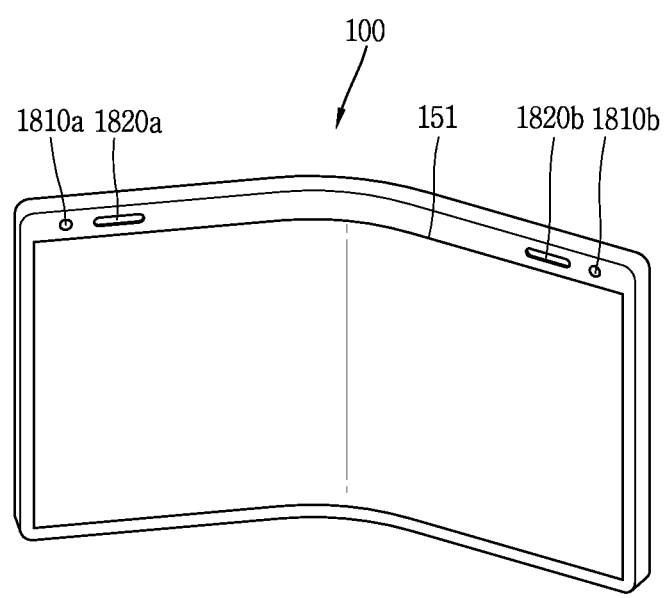
Figure 19A:
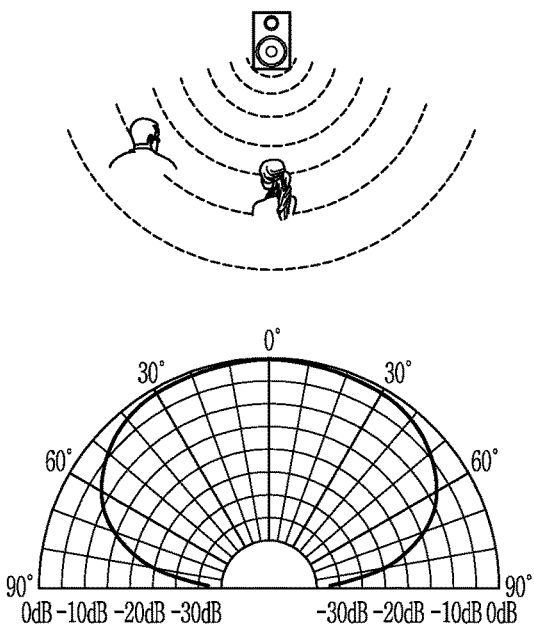
FIGS. 19A and 19B are conceptual views illustrating a speaker of a mobile terminal according to the present disclosure.
Figure 19B:
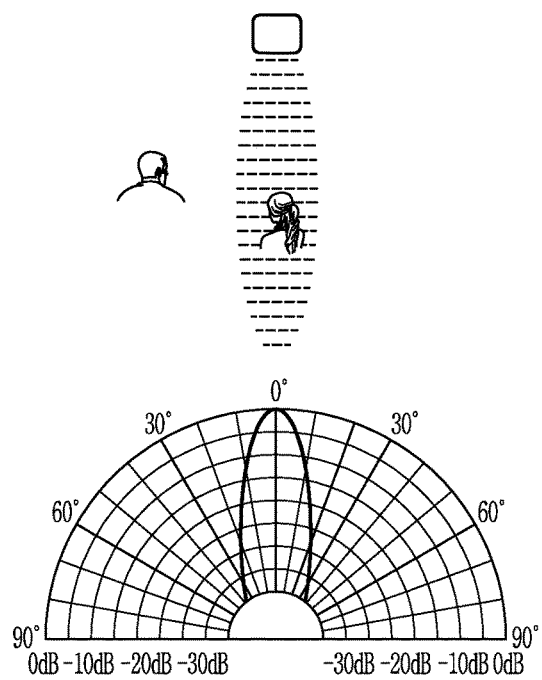

Meanwhile, the mobile terminal according to the present disclosure has a plurality of cameras and a plurality of speakers. FIGS. 18A and 18B are conceptual views illustrating a camera and a speaker provided in a mobile terminal according to the present disclosure, and FIGS. 19A and 19B are conceptual views illustrating a speaker of a mobile terminal according to the present disclosure.

In the present disclosure, a plurality of directional speakers 1820a and 1820b may be provided. The plurality of directional speakers may not output a sound in a direction other than the specific direction.

Here, the plurality of directional speakers may have different sound output directions. Here, output directions of sounds of the respective plurality of directional speakers may be set in advance and released.

Also, as for the plurality of directional speakers, it is possible to set a distance for a sound output from the plurality of directional speakers to reach. In addition, it is also possible to control a volume of a sound reached from a specific position.

Referring to FIG. 19A, in case of a general speaker, a sound output from the general speaker may be radiated circularly, centered around the speaker, so as to be output. However, referring to FIG. 19B, a sound output from a directional speaker may be radiated in the specific direction.

Also, the directional speaker may output a sound in the specific direction using an ultrasonic band. That is, the directional speaker may control a direction of a sound by using a sound of an ultrasonic band having a short wavelength.

The plurality of directional speakers may be disposed on a front surface and a rear surface of the mobile terminal. That is, in a case in which at least some of the plurality of directional speakers is disposed on the front surface, a sound may be output in a forward direction of the mobile terminal, and when the plurality of directional speakers are disposed on the rear surface, a sound may be output in a backward direction of the mobile terminal. For example, the plurality of directional speakers may be disposed on opposing ends of the front surface and the rear surface of the mobile terminal.

Meanwhile, in the present disclosure, the directional speaker may be controlled to operate as a general speaker. That is, in the present disclosure, whether to output a sound in a specific direction or whether to output a sound like a general speaker may be set according to a user setting.

Also, the plurality of directional speakers may separately have a driving unit. The driving unit may change a posture of the directional speakers to change an output direction of a sound output from the directional speakers. That is, when an output direction of a sound is determined, the controller 180 may change a posture of the plurality of directional speakers by using the driving unit such that a output may be output in an output direction of the sound. In detail, the driving unit may rotate the plurality of directional speakers to change a posture of the plurality of directional speakers. Here, the posture of the plurality of speakers may be defined as a degree to which the plurality of directional speakers are rotated with respect to a preset reference axis. The preset reference axis may have a direction perpendicular to a plane of the display unit 151 in a state in which a radius of curvature of the display unit 151 is not bent, i.e., infinite.

Hereinafter, a "speaker" or a "directional speaker" will be used together, and it may be understood that a concept of the "directional speaker" is included in the term of "speaker".

Hereinafter, embodiments related to a control method that may be implemented in the mobile terminal configured as described above will be described with reference to the accompanying drawings. It will be apparent to those skilled in the art that modifications and variations can be made without departing from the spirit and scope of the invention.

Figure 20:
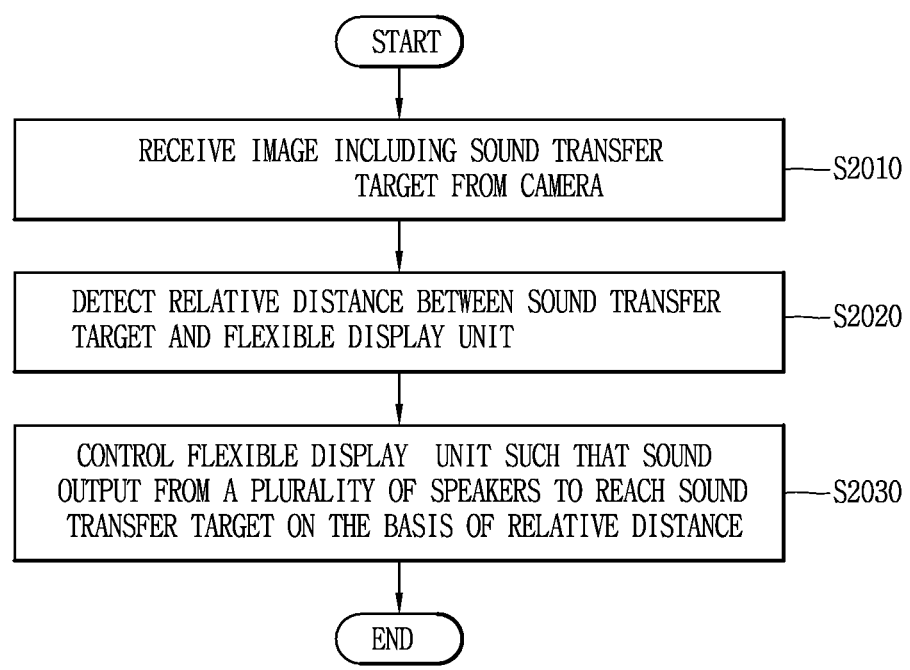
FIG. 20 is a flow chart illustrating a method for controlling an output direction of a sound in a mobile terminal according to the present disclosure.

FIG. 20 is a flow chart illustrating a method for controlling an output direction of a sound in a mobile terminal according to the present disclosure, and FIGS. 21A, 21B, 21C, and 21D are conceptual views illustrating a control method of FIG. 20.

The mobile terminal according to an embodiment of the present disclosure may receive an image including a transfer target of a sound output from a plurality of speakers (S2010).

A sound such as various notification sounds and a sound according to execution of a function may be output from the mobile terminal. Here, in the present disclosure, in order to easily transfer the sound to the user, various controlling may be performed. Hereinafter, various methods for controlling an output direction of a sound will be described.

As illustrated in FIGS. 18A and 18B, the mobile terminal according to the present disclosure may include a display unit 151, a plurality of cameras 1810a, 1810b, and a plurality of speakers 1810a and 1810b.

Meanwhile, the speakers and the cameras may be disposed to be spaced apart from each other. For example, as illustrated in FIG. 18B, the speakers may be disposed to be spaced from each other at both ends of the display unit, respectively. Also, like the speakers, the cameras may be disposed to be spaced apart from each other at both ends of the display unit.

The speakers may output a sound related to a function being executed in the mobile terminal. For example, when music is played in the mobile terminal, the speakers may output the music. In another example, the speakers may output various notification sounds of a system of the mobile terminal.

Here, the speakers provided in the mobile terminal may be directional speakers. In this case, when the directional speakers are positioned in a specific direction in which a sound is output, the user may hear the sound output from the speakers.

Here, the controller 180 may change a state of the display unit 151 such that the user may be positioned in a direction in which directional speakers output a sound. Here, the display unit 151 may be placed in any one of a first state having an infinite radius of curvature and a second state having a finite radius of curvature. That is, the controller 180 may change the display unit 151 to any one of the first and second states.

Also, when the state of the display unit 151 is changed, a direction in which the speakers output a sound may also be changed together. That is, the speaker may be connected to one region of the display unit 151.

In order to make a sound output from the speaker be oriented to a transfer target, the controller 180 may receive an image including the transfer target of the sound through the camera.

Here, the transfer target of the sound may be the user who uses the display unit 151. Also, the transfer target of the sound may be a person designated by the user. That is, the transfer target of the sound may be a person who satisfies a preset condition or may be set by the user.

Also, the mobile terminal according to an embodiment of the present disclosure may detect a relative distance between the transfer target of the sound and the display unit by using the image received from the camera (S2020).

The controller 180 may determine a transfer target of the sound by using the image received from the camera. In detail, the controller 180 may determine a transfer target of the sound by analyzing the image.

When the transfer target of the sound is determined, the controller 180 may detect a relative distance between the transfer target of the sound and the display unit 151. In this case, the controller 180 may detect the relative distance by using an image regarding the same target from at least two cameras disposed at different positions.

Thereafter, the mobile terminal according to an embodiment of the present disclosure may change a state of the display unit such that the sound output from the plurality of speakers may reach the determined transfer target of the sound, on the basis of the detected relative distance (S2030).

In the mobile terminal according to an embodiment of the present disclosure, a plurality of speakers may be disposed to be spaced apart from each other in a region of the display unit 151. Here, the controller 180 may cause the display unit 151 to be bent to change a direction of the sound output from the speaker together.

In detail, the controller 180 may change the display unit in the first state to the second state on the basis of the display unit 151 and the relative distance of the determined transfer target of the sound.

Here, a radius of curvature of the display unit 151 in the second state may be determined on the basis of the detected relative distance. When the radius of curvature is determined, the controller 180 may cause the display unit 151 to be bent to have the radius of curvature.

Also, in the present disclosure, the mobile terminal may further include a deformation sensing unit (please refer to FIG. 2A) for sensing an angle due to bending of the display unit 151. Here, the controller 180 may calculate an angle at which the display unit 151 is bent to have the radius of curvature. Also, the controller 180 may cause the display unit 151 to be bent to have the angle. Here, the angle may refer to an angle formed by two planes of the display unit 151 generated as the display unit 151 is bent.

That is, in the present disclosure, an output path of a sound output from the plurality of speakers may be changed. Accordingly, the sound may be accurately transferred to a determined target. Also, in the present disclosure, the sound may not be transferred to the vicinity other than the transfer target of the sound.

Meanwhile, in the present disclosure, the radius of curvature of the display unit 151 according to the relative distance between the transfer target of the sound and the display unit 151 may be stored in the memory unit 170 in advance. For example, when the relative distance is a first distance, the controller 180 may control the display unit to have a first radius of curvature. Also, the controller 180 may calculate a radius of curvature in real time on the basis of the relative distance.

Here, the controller 180 may change the radius of curvature of the display unit 151 on the basis of the relative distance of the user in real time. Also, when the user's movement is not sensed for more than a predetermined period of time, the controller 180 may change the radius of curvature of the display unit 151 on the basis of a relative distance between the user and the display unit 151. That is, in order to remove inconvenience due to a frequent change in the radius of curvature of the display unit 151, the controller 180 may perform controlling to change the radius of curvature only when a predetermined relative distance is maintained for more than a preset period of time.

Meanwhile, in the above description, when a sound is output, a transfer target of the sound is sensed to change an output direction of the sound. However, in the present disclosure, even though a sound is output, a change in an output direction of the sound may be limited by a user setting. That is, in the present disclosure, a change of the radius of curvature of the display unit may be limited.

Also, in the above description, the plurality of directional speakers are provided in the display unit 151 and an output direction of a sound is changed by changing a state of the display unit 151. However, the present disclosure is not limited thereto and an output direction of a sound output from the plurality of directional speakers may be changed even without changing a posture of the display unit 151, through a plurality of driving units respectively provided in the plurality of directional speakers or through a single driving unit controlling a posture of the plurality of directional speakers.

That is, when a transfer target of a sound is sensed through a plurality of cameras, a speaker of the directional speaker may be changed to transfer a sound to the transfer target of the sound by using the driving unit.

In addition, in the present disclosure, the sound may be transferred to the transfer target of the sound by controlling the driving unit together, as well as changing a state of the display unit 151. In this case, the controller 180 may control an output direction of the sound by two stages.

In detail, when an output direction of the sound is determined, the controller 180 may change a radius of curvature of the display unit 151 such that the sound may be output in an output direction of the sound. Here, controlling the output direction of the sound by using the posture of the display unit 151 may be referred to as rough adjustment.

Also, in a state in which the display unit 151 is bent, the controller 180 may control an output direction of the plurality of directional speakers by using the driving unit. Here, in a state in which the display unit 151 is bent, the controller 180 may change a posture of the plurality of speakers such that the sound may be more accurately transferred to the transfer target of the sound. Here, changing the posture of the speaker using the driving unit may be referred to as fine adjustment. Here, the rough adjustment and the fine adjustment may be modified to various names.

That is, in the present disclosure, an output direction of a sound of the directional speaker may be controlled by two stages.

In the present disclosure, a sound may be transferred to the transfer target of the sound through at least one controlling among controlling to change a state of the display unit 151 and controlling to change a posture of the speaker itself by using the driving unit provided in the plurality of directional speakers. In this manner, in the present disclosure, the sound may be more accurately transferred to the transfer target of the sound.

In the following embodiment, a method for controlling an output direction of a sound mainly through bending of the display unit 151 will be described, but it may also be applied to a case in which the output direction of a sound is controlled by using a driving unit, in the same manner.

Hereinafter, a method for transferring a sound by bending the display unit 151 will be described in more detail.

Figure 21A:
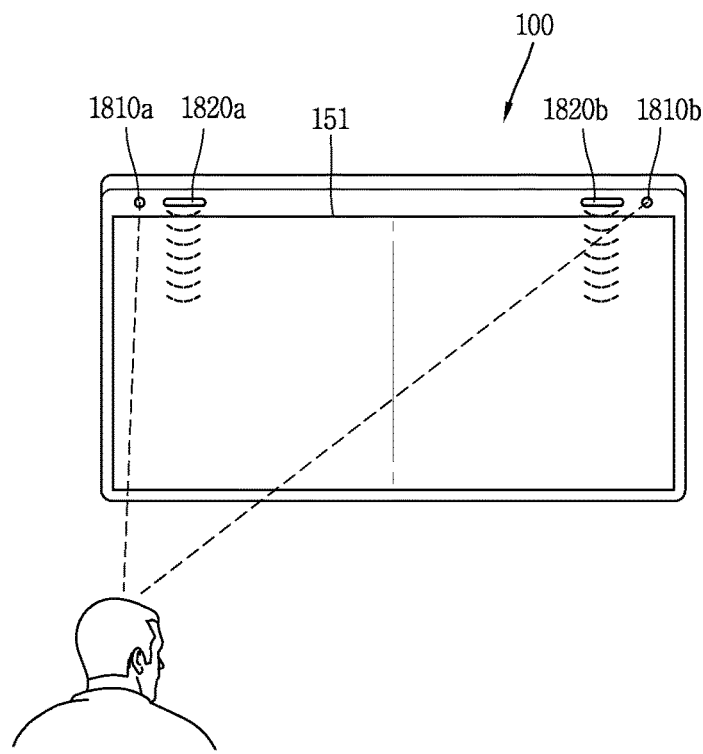
FIGS. 21A, 21B, 21C, and 21D are conceptual views illustrating a control method of FIG. 20.

For example, as illustrated in FIG. 21A, the controller 180 may receive an image including a transfer target of a sound by using a plurality of cameras 1810a and 1810b. Here, the controller 180 may detect a relative distance between the transfer target of the sound output from the plurality of speakers 1820a and 1820b and the display unit 151.

Figure 21B:
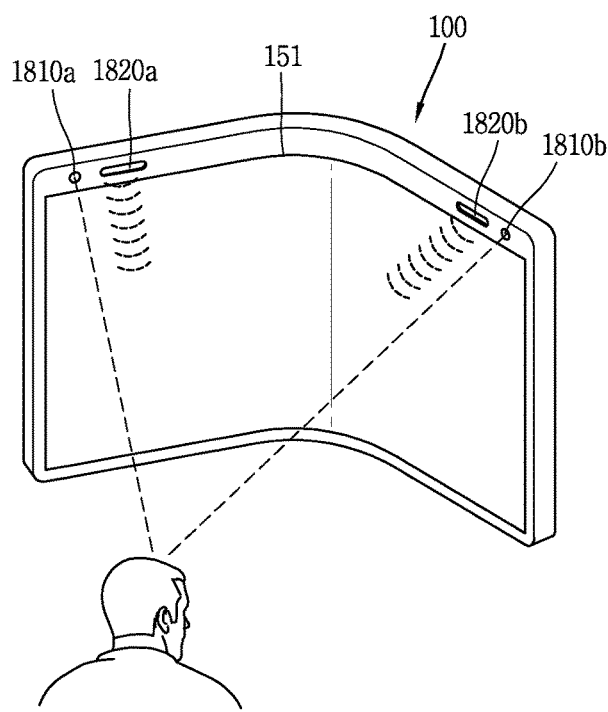

Thereafter, the controller 180 may calculate a radius of curvature of the display unit 151 on the basis of the detected relative distance. Also, the controller 180 may control the display unit 151 to have the calculated radius of curvature. For example, as illustrated in FIG. 21B, the controller 180 may switch the display unit 151 from the first state to the second state such that a sound output from the plurality of speakers 1820a and 1820b may be transferred to a transfer target of the sound.

In addition, the controller 180 may control the display unit 151 to have the calculated radius of curvature. Here, as illustrated in FIG. 21B, when opposing ends of the display unit 151 move together, the controller 180 may change all the output directions of the sound output from each of the plurality of speakers 1820a and 1820b.

In addition, after a state of the display unit 151 is changed, the controller 180 may change a posture of the plurality of speakers 1820a and 1820b by using a driving unit (not shown) provided in the plurality of speakers 1820a and 1820b. Here, only the posture of the plurality of speakers 1820a and 1820b may be changed, while maintaining the state of the display unit 151. In this manner, in the present disclosure, the sound may be more accurately transferred to the transfer target of the sound.

Meanwhile, the controller 180 may change the radius of curvature of the display unit 151 on the basis of the relative distance between the transfer target of the sound and the display unit 151.

Here, the controller 180 may detect the relative position of transfer target of the sound with respect to the display unit 151 at a preset time interval or in real time. Also, when a position of the transfer target of the sound is changed, the controller 180 may control the display unit 151 to have a radius of curvature based on the changed position.

Figure 21C:
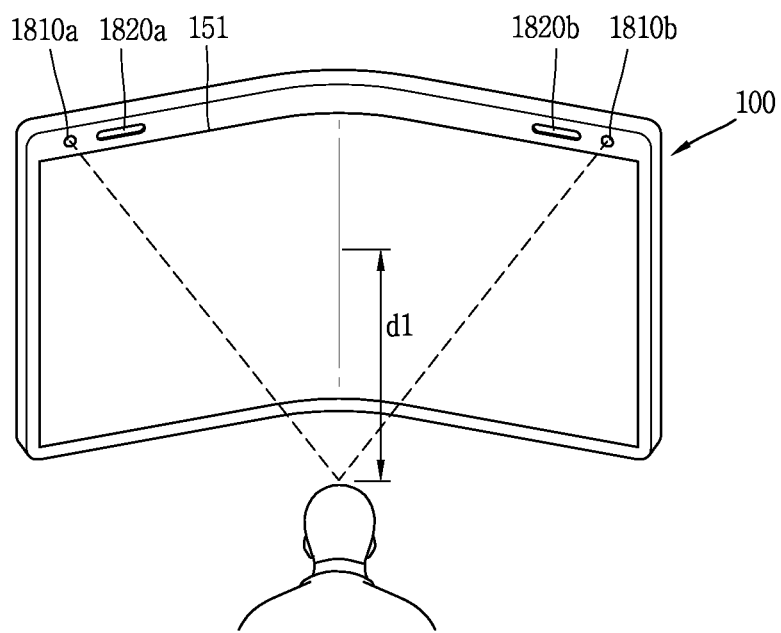

For example, as illustrated in FIG. 21C, when a relative distance between the display unit 151 and the transfer target of the sound is d1, the controller 180 may change the display unit 151 to have a first radius of curvature.

Figure 21D:
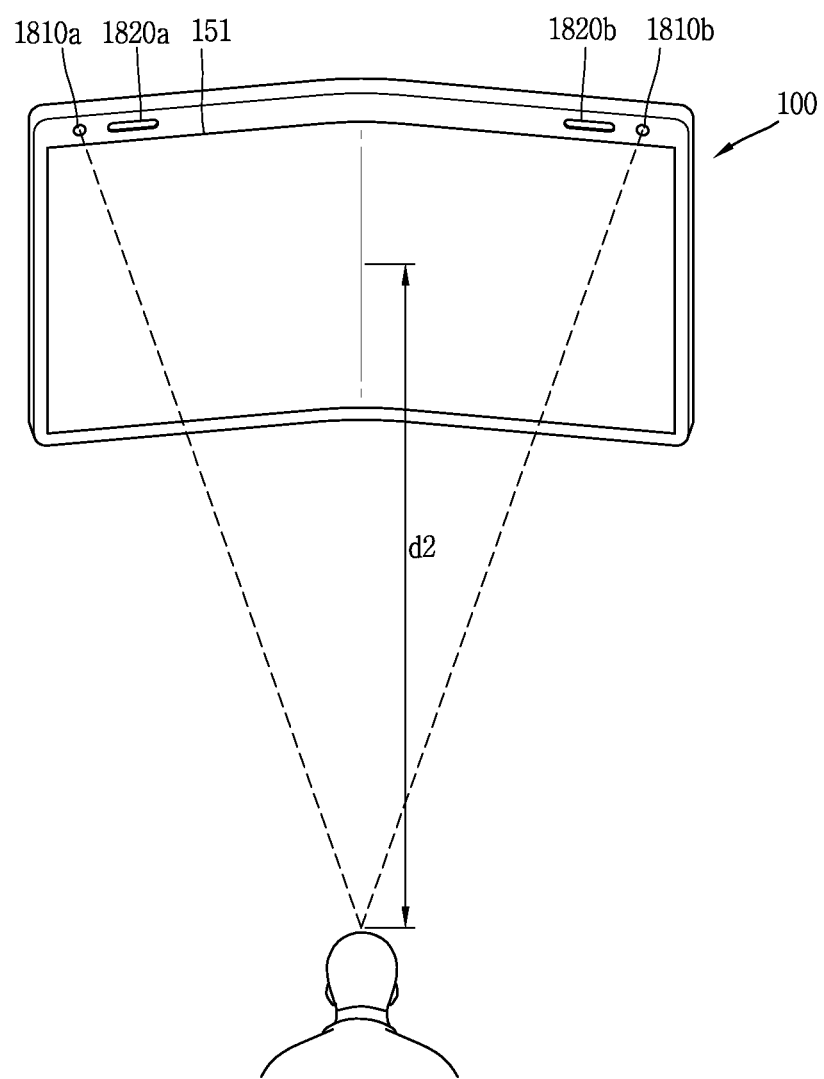

Also, as illustrated in FIG. 21D, when the relative distance between the display unit 151 and the transfer target of the sound is changed to d2, the controller 180 may change the display unit 151 to have a second radius of curvature different from the first radius of curvature.

Also, although not shown, in the present disclosure, when it is sensed that the relative distance is changed in a state in which the display unit 151 is bent, the controller 180 may control an output direction of a sound by changing a posture of the plurality of speakers 1820a and 1820b by using the driving unit, without changing a state of the display unit 151.

In this manner, in the present disclosure, even though the transfer target of the sound moves, the sound may be transferred to the moving transfer target of the sound.

In the above, the control method for accurately transferring a sound to a transfer target of the sound in the mobile terminal having the plurality of speakers and the display unit has been described.

Hereinafter, a method for determining a transfer target of a sound when a plurality of targets are present in an image received from a camera. FIGS. 22A to 22D are conceptual views illustrating a method for determining a transfer target of a sound.

When there are a plurality of transfer targets of a sound, the mobile terminal according to the present disclosure may perform controlling to transfer the sound to any one of the plurality of targets according to a preset condition.

Here, the preset condition may be set in advance or may be set by the user.

For example, the mobile terminal according to the present disclosure may store information of a transfer target of a sound in the memory unit 170 in advance. Here, the information of the transfer target of the sound may be face image information of a person. That is, in the present disclosure, when a transfer target of a sound is sensed, the controller 180 may control the display unit 151 to accurately transfer the sound to the transfer target of the sound automatically.

Here, the information of the transfer target of the sound may be stored according to usage specification of the mobile terminal or may be stored by the user. That is, the information of the transfer target of the sound may be set as a transfer target of the sound or set as a transfer target of a sound by more than a preset number of times, and may be automatically stored according to usage specification of the mobile terminal or stored in the memory unit 170 by a user setting.

Meanwhile, the controller 180 may receive an image including a plurality of people 2200, 2210, and 2220 from the plurality of cameras 1820a and 1820b. For example, as illustrated in FIG. 22A, an image including a plurality of people 2200, 2210, and 2220 from the cameras 1810a and 1810b may be displayed on the display unit 151.

Figure 22A:
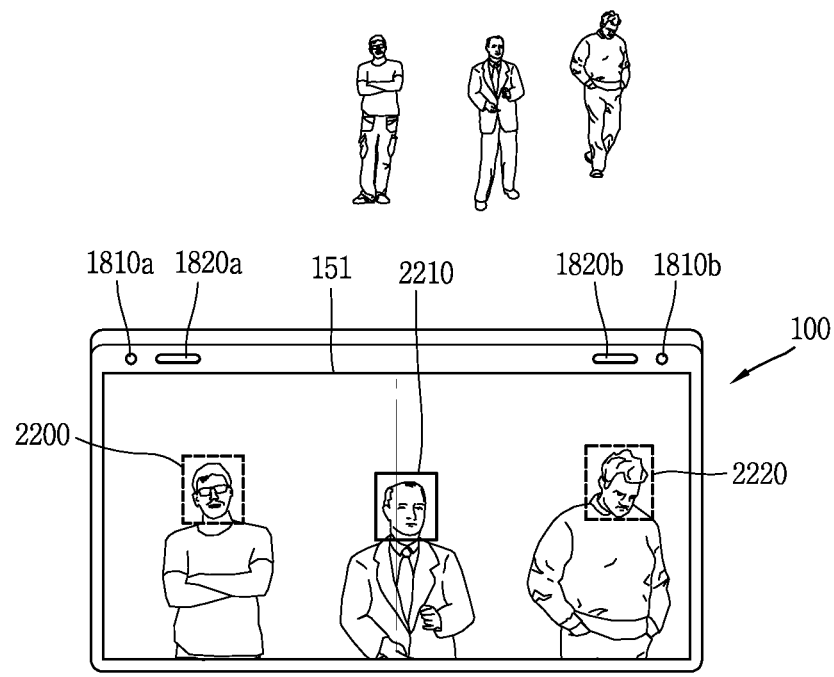
FIGS. 22A, 22B, 22C, and 22D are conceptual views illustrating a method for determining a transfer target of a sound.

Here, as illustrated in FIG. 22A, the controller 180 may determine whether there is a face image matched to the image currently received from the cameras 1810a and 1810b among pieces of face image information stored in the memory unit 170. In detail, the controller 180 may determine whether a person of the image including the plurality of people 2200, 2210, and 2220 currently received from the cameras 1810a and 1810b matches the face image stored in the memory unit 170 through face analysis.

Here, when the person 2210 matches the face image stored in the memory unit 170, the controller 180 may control the display unit 151 to transfer a sound to the person 2210 by using the image of the person 2210.

Figure 22B:
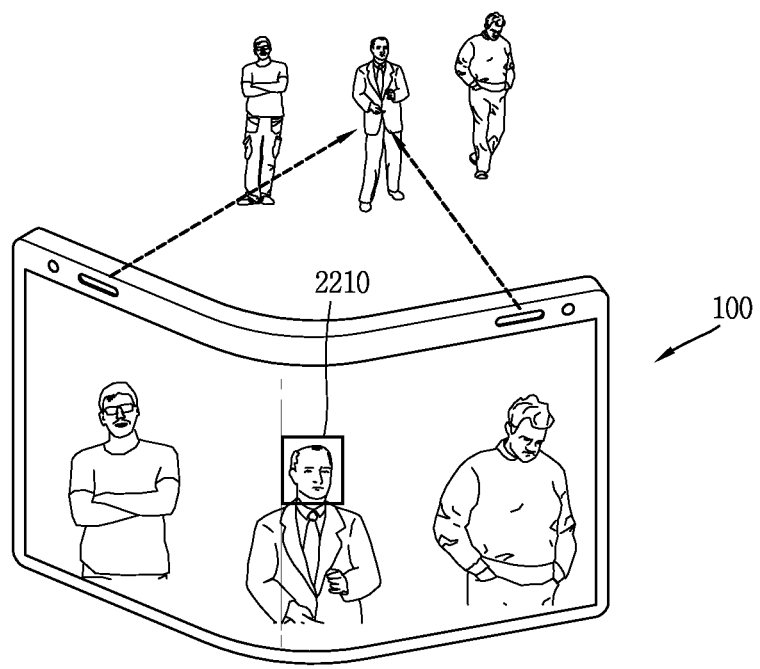

For example, as illustrated in FIG. 22B, when any one person is selected, the controller 180 may bent the display unit 151 with respect to the one person 2210.

Here, in order to control a state of the display unit 151 to transfer the sound to the person, the same method as described above is used. Also, when any one person is selected, a method for changing a posture of the speaker using the driving unit may also be used. In addition, changing a state of the display unit 151 and controlling using the driving unit may also be performed together.

Meanwhile, the controller 180 may cause the user directly to select a transfer target of the sound, rather than face recognition. For example, as illustrated in FIG. 22C, the plurality of people 2200, 2210, and 2220 from the cameras 1810a and 1810b may be displayed on the display unit 151.

Figure 22C:
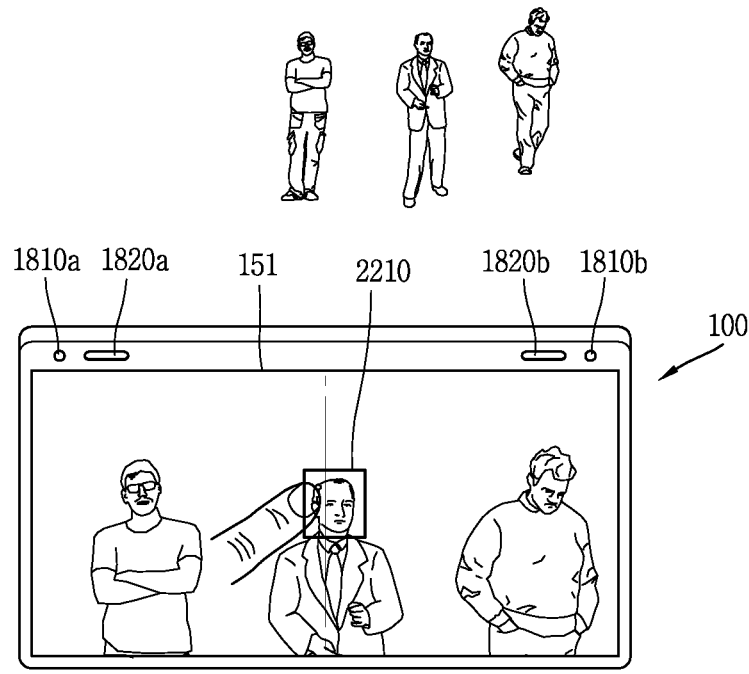

For example, as illustrated in FIG. 22C, the user may select any one person among the plurality of people 2200, 2210, and 2220 by applying a touch input to the display unit 151. Here, the controller 180 may detect the face image 2210 displayed in the region to which the touch has been applied on the display unit 151.

Figure 22D:
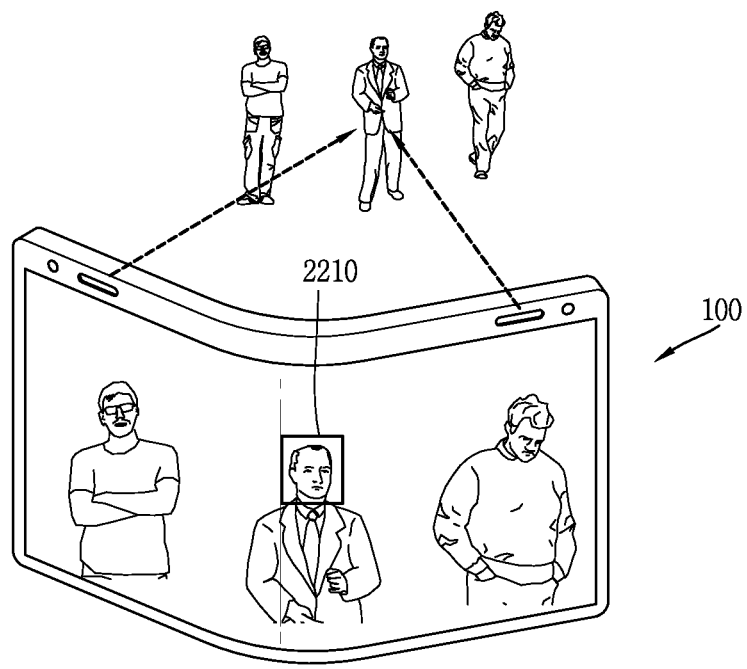

As illustrated in FIG. 22D, the controller 180 may bend the display unit 151 such that a sound may be transferred to the person corresponding to the detected face image. Also, when any one person is selected, a method for changing a posture of the speaker using the driving unit may also be used. In addition, changing a state of the display unit 151 and controlling using the driving unit may also be performed together.

In the above, the method for setting a transfer target of a sound when an image including a plurality of people is received has been described. In this manner, in the present disclosure, a sound may be transferred only to a specific person even when a plurality of people are present.

Figure 23A:
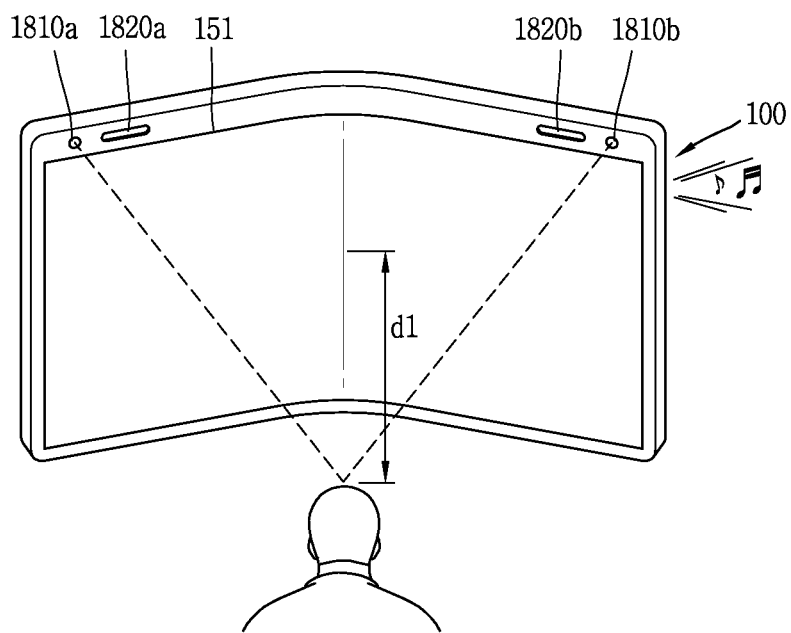
FIGS. 23A, 23B, 23C, 23D, 23E, and 23F are conceptual views illustrating a control method of a mobile terminal when a specific person moves in position, while hearing a sound.
Figure 23B:
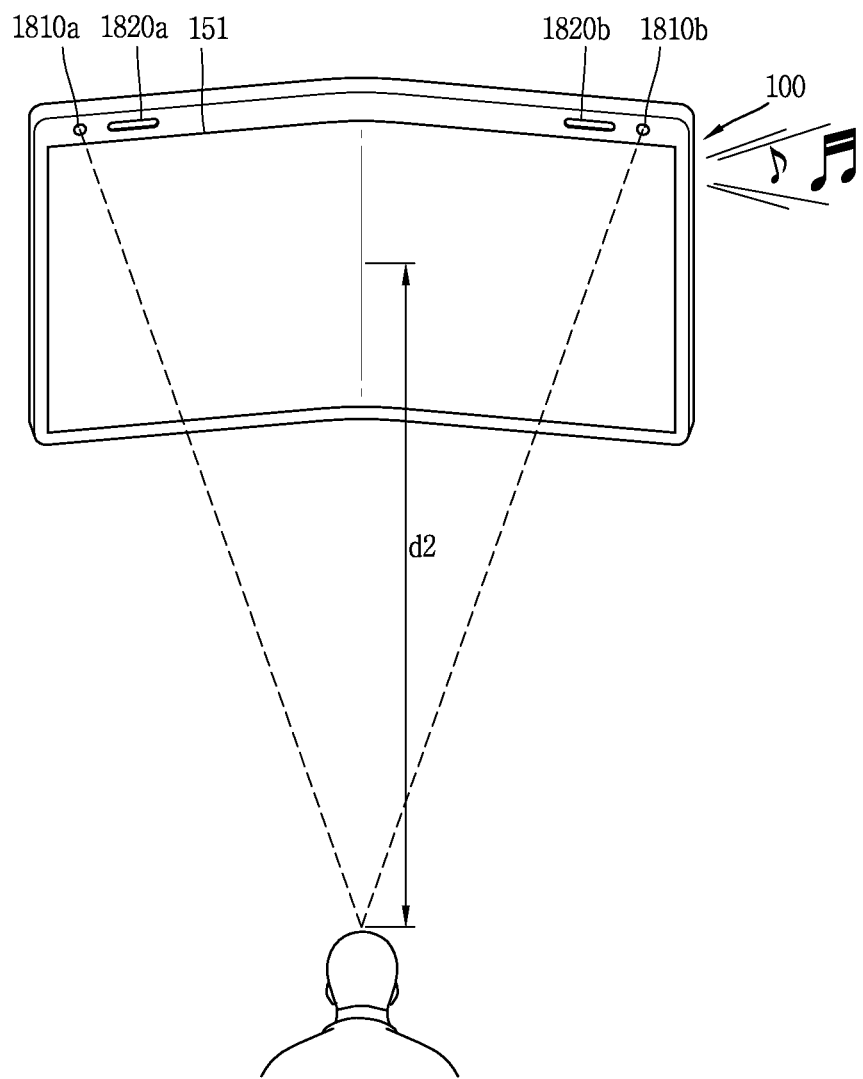
Figure 23C:
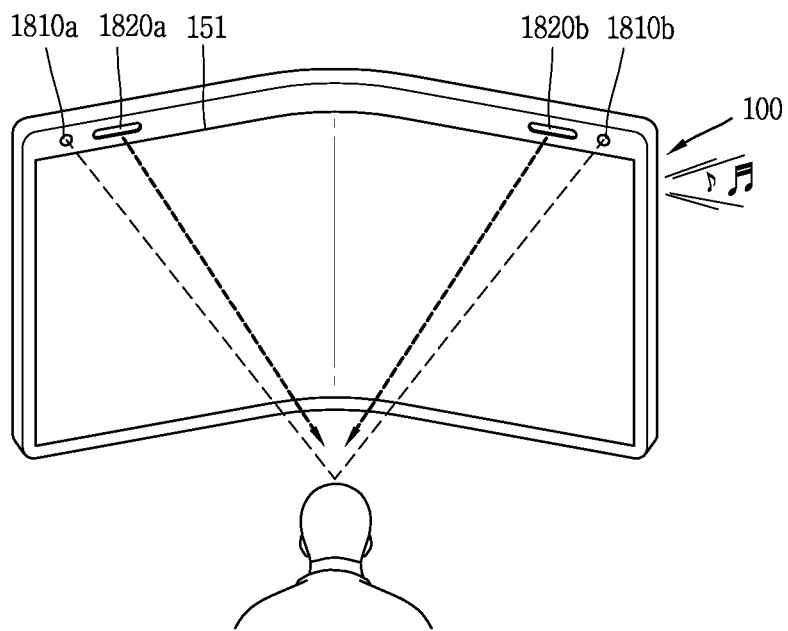

Hereinafter, a method for controlling whether to output a sound and a magnitude of a sound when a specific person moves in position while a sound is being transferred to the specific person will be described. FIGS. 23A, 23B, and 23C are conceptual views illustrating a control method of a mobile terminal when a specific person moves in position, while hearing a sound.

The controller 180 may bend the display unit such that a sound may be transferred only to a specific person. In a state in which the sound is being transferred to the specific person, the controller 180 may sense that a position of the specific person is changed.

For example, as illustrated in FIG. 23A, when a relative distance between the specific person and the display unit 151 is d1, the controller 180 may output a sound with a first magnitude.

Here, the controller 180 may sense that the relative distance between the specific person and the display unit 151 is changed to d2 greater than d1. Here, the controller 180 may change the magnitude of the output sound to a second magnitude greater than the first magnitude, as well as controlling bending of the display unit 151 on the basis of the relative distance d2.

Also, in the present disclosure, in a state in which a sound is transferred to a specific person, the specific person may not be sensed any longer. Here, when the specific person is not sensed by the cameras 1810a and 1180b any longer, the controller 180 may stop outputting the currently output sound.

For example, as illustrated in FIG. 23A, the controller 180 may change the display unit 151 to the second state such that a sound may reach the specific person.

Figure 23D:
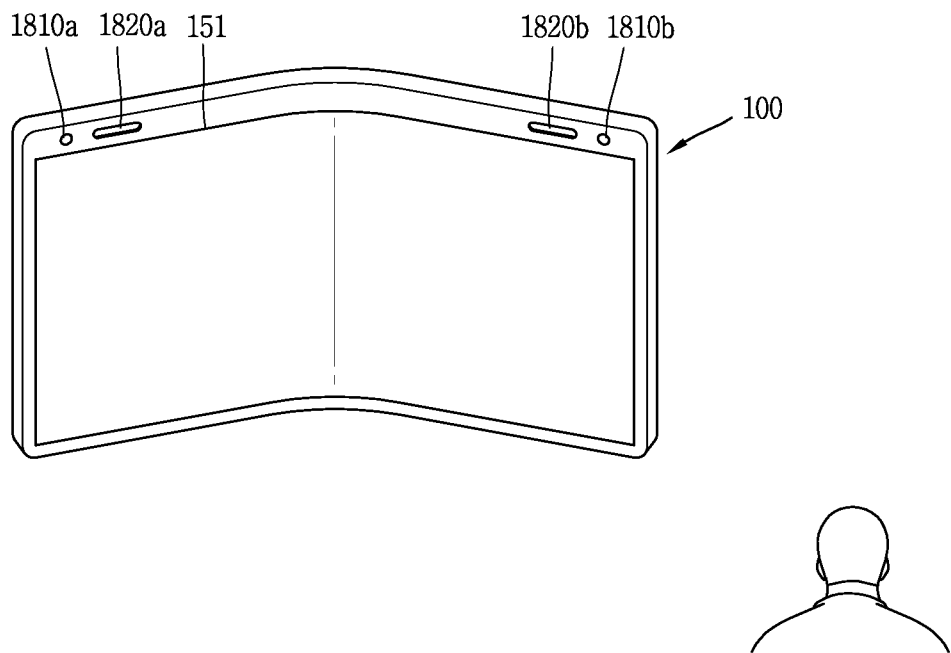

Also, as illustrated in FIG. 23D, when the specific person is not sensed, the controller 180 may stop the output sound.

That is, when a person to receive the sound is not sensed, the sound is automatically blocked to prevent the sound from being unnecessarily transferred to someone else.

Also, regarding an image corresponding to a specific person received from the camera, the controller 180 may control whether to output a sound through face recognition. The controller 180 may detect information regarding whether a face of the specific person currently faces the display unit 151, position information of the ears of the specific person, and the like, through face recognition.

Figure 23E:
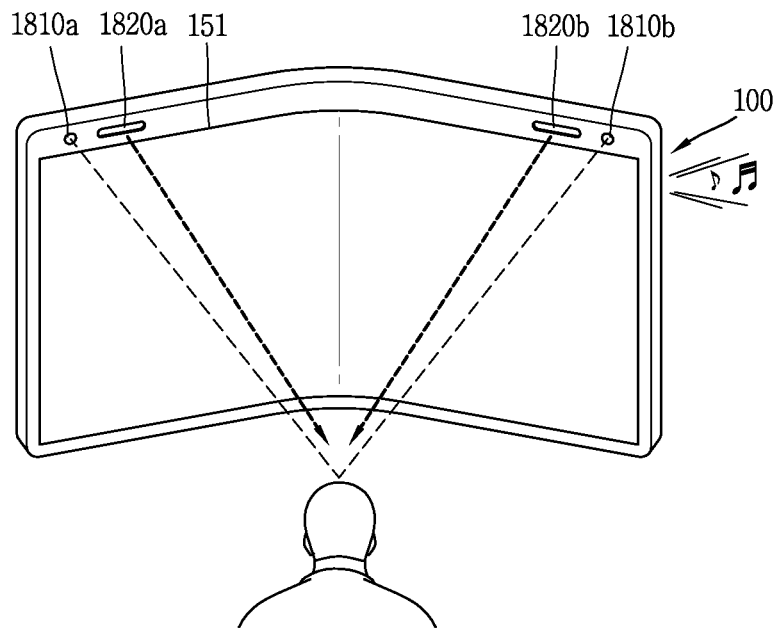
Figure 23F:
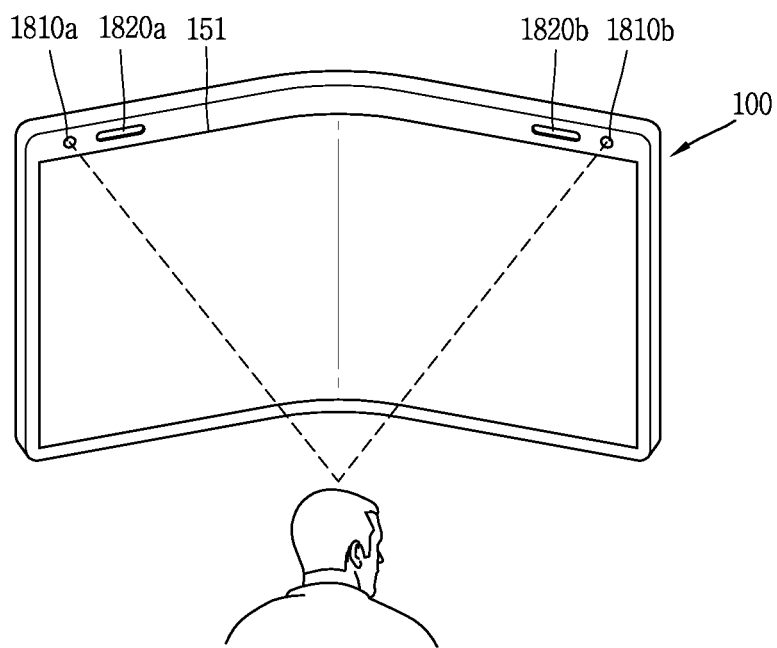

Here, the controller 180 may determine whether to output the sound output through the speaker by using the information obtained through the face recognition. For example, as illustrated in FIG. 23E, when a face of the specific person to receive the sound faces the front surface of the display unit 151, the controller 180 may change a radius of curvature of the display unit 151 such that the sound may be transferred to the specific person.

In a state in which the sound is being transferred to the specific person, the controller 180 may sense that the face of the specific person does not face the front side of the display unit 151. In detail, the controller 180 may detect a direction in which the face of the specific person is currently oriented by sensing the position of the ears of the specific person through the face recognition of the specific person.

Here, when it is determined that the face of the specific person does not face the front surface of the display unit 151, the controller 180 may stop outputting the sound which has been transferred to the specific person. In this case, the controller 180 may determine that the specific person does not listen to the sound any longer.

That is, in the present disclosure, in a public place such as a subway, or the like, a specific sound may be transferred to the user of the mobile terminal. Also, in the present disclosure, even when a sound is transferred to the specific person, whether to output a magnitude of the sound and whether to output the sound may also be controlled together by determining user's needs. In this manner, a situation in which a sound is not required to be output may be automatically determined, thus preventing unnecessary output of the sound.

Figure 24A:
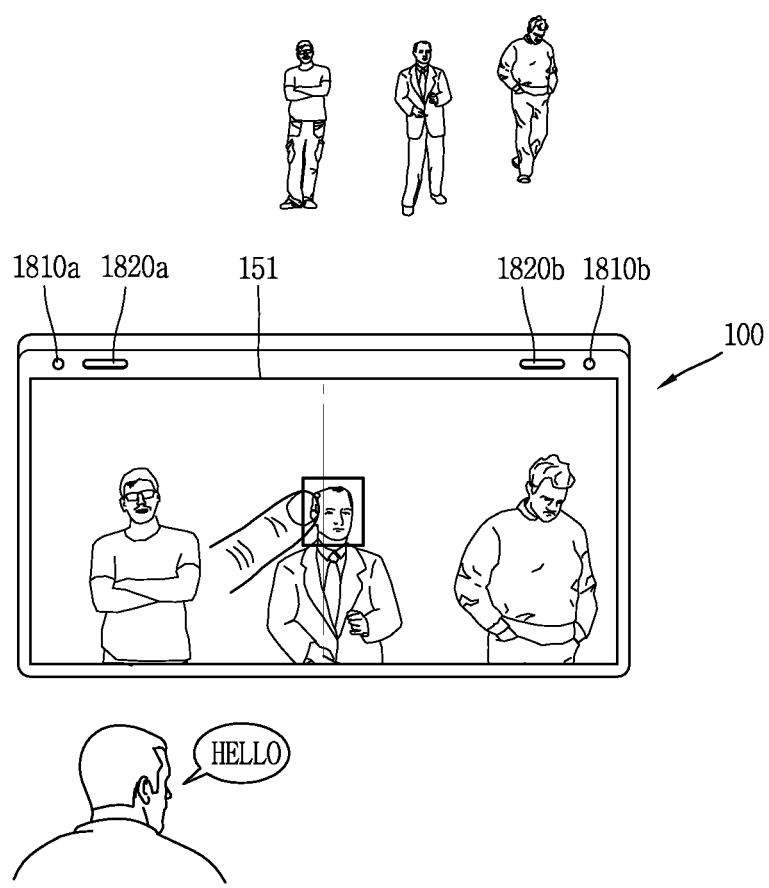
FIGS. 24A and 24B are conceptual views illustrating a method for transferring a specific sound to a specific person.
Figure 24B:
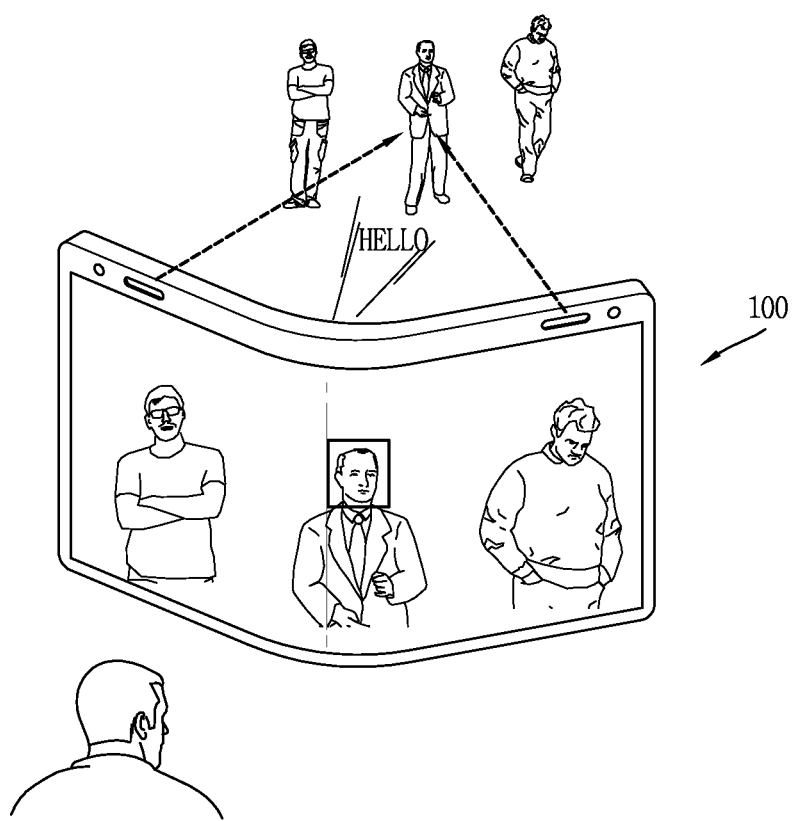

In the above, the method for controlling a magnitude of a sound and whether to output a sound through face recognition has been described. Hereinafter, a method for transferring a specific sound to a specific person will be described. FIGS. 24A and 24B are conceptual views illustrating a method for transferring a specific sound to a specific person.

The mobile terminal according to an embodiment of the present disclosure may include a plurality of directional speakers controlled in a direction of a sound such that the sound is transferred to a specific person. Also, the mobile terminal according to an embodiment of the present disclosure may have a directional microphone for selectively receiving only a sound of a specific person.

Here, the controller 180 may control a radius of curvature of the display unit 151 such that a voice received from the user of the mobile terminal is selectively transferred to the specific person through a plurality of speakers.

For example, as illustrated in FIG. 24A, the controller 180 may receive a voice of the user of the mobile terminal. Also, the controller 180 may receive an image regarding a plurality of people as a transfer target of a sound from the plurality of cameras 1810a and 1810b and display the same on the display unit 151.

Here, the controller 180 may transfer the received voice to any one of the plurality of people displayed on the display unit 151. Here, the person to which the sound is to be transferred may be selected by applying a touch to the image of the person displayed on the display unit 151. For example, as illustrated in FIG. 24A, the controller may set any one person as a transfer target of the sound on the basis of a touch applied to a region in which the image regarding the any one person is displayed in the image regarding the plurality of people displayed on the flexible display unit 151.

When the transfer target of the sound is set, the controller 180 may detect a relative distance between the transfer target of the sound and the display unit 151 and control the display unit 151 to be bent on the basis of the detected relative distance.

Here, in order to control a state of the display unit 151 such that the sound is transferred to the person, the same method as described above is used. Also, when any one person is selected, a method for changing a posture of the speaker using the driving unit may also be used. In addition, changing the state of the display unit 151 and controlling using the driving unit may be performed together.

In this manner, in the present disclosure, a specific sound may be selectively transferred to the specific person by utilizing the characteristics of the directional speaker. Also, in the present disclosure, an output direction of a sound may be more simply controlled by utilizing the bending characteristics of the display unit, even without performing controlling to change a position of the directional speaker.

Figure 25A:
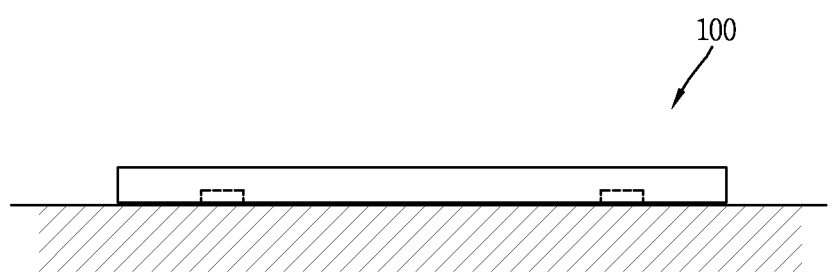
FIGS. 25A and 25B are conceptual views illustrating a control method when an object is present in the vicinity of a mobile terminal according to an embodiment of the present disclosure.
Figure 25B:
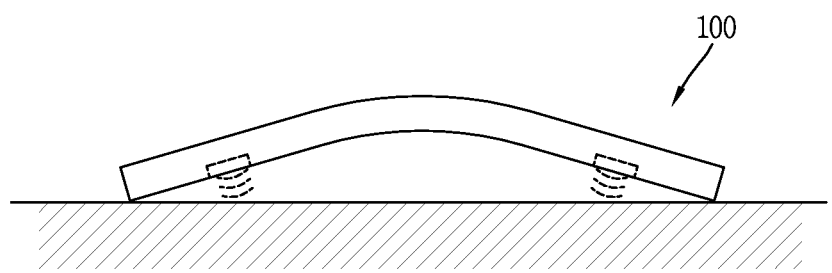

In the above, the method for transferring a specific sound to a specific person has been described. Hereinafter, a method for avoiding an obstacle present in an output path in which a sound is output will be described. FIGS. 25A and 25B is a view illustrating a control method when an object is present in the vicinity of a mobile terminal according to an embodiment of the present disclosure.

When an obstacle is present in an output path along which a sound is output from a speaker, the sound may not be properly transferred to a target that the sound is to reach. That is, the sound may be changed in an output path thereof or interfered by the obstacle.

Thus, in order to transfer a sound to a specific person only in a specific direction, in the present disclosure, if an obstacle is present in an output path of a sound output from the speaker, the obstacle may be avoided.

Here, in the present disclosure, the mobile terminal may further include a sensing unit (i.e., a proximity sensor) capable of sensing an obstacle in the vicinity of a speaker.

In detail, when an object is sensed to be present in the vicinity of the speaker through the sensing unit, the controller 180 may bent the display unit 151 such that output of a sound may not be interfered.

For example, as illustrated in FIG. 25A, the controller 180 may sense that an object is present in the vicinity of the speaker. Here, as illustrated in FIG. 25B, the controller 180 may cause the display 151 to be bent such that the speaker is separated form the object present in the vicinity of the speaker.

Here, in order to control a state of the display unit 151 such that a sound is transferred to the person, the same method as described above is used. Also, when any one person is selected, a method for changing a posture of the speaker using the driving unit may also be used. In addition, changing a state of the display unit 151 and controlling using the driving unit may also be performed together.

In this manner, in the present disclosure, when an object is present in the vicinity of the speaker, the speaker and the object may be separated such that an output path of a sound output from the speaker may not be interfered.

In the above, a method for bending the display unit 151 when an object is positioned in an output path of a sound has been described. Hereinafter, a method for providing guide information regarding bending of the display unit 151 will be described. FIGS. 26A, 26B, 26C, 27A, 27B, and 27C are conceptual views illustrating a method for providing guide information.

In the mobile terminal according to an embodiment of the present disclosure, an output path of a sound may be changed using bending characteristics of the display unit 151.

Here, the controller 180 may deform the display unit 151 such that a sound may be transferred to a target to receive the sound, and the user may provide guide information to cause the display unit 151 to be bent.

Figure 26A:
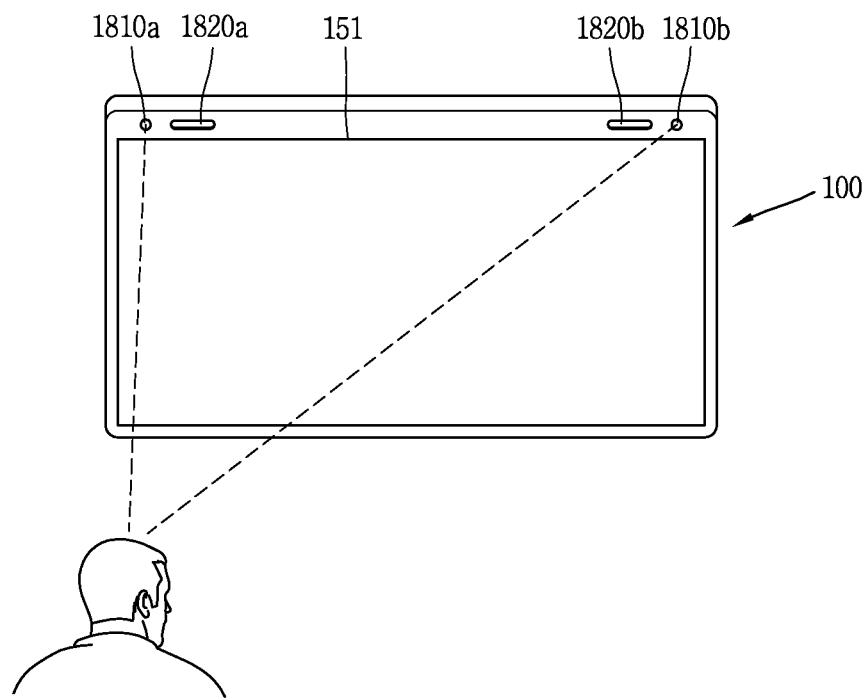
FIGS. 26A, 26B, 26C, 27A, 27B, and 27C are conceptual views illustrating a method for providing guide information.

For example, as illustrated in FIG. 26A, when a target to receive a sound is sensed through the cameras 1810a and 1810b, the controller 180 may calculate a degree to which the display unit is bent to transfer a sound to the target to receive the sound.

Here, the controller 180 may provide guide information to the user so that the user may bend the display unit 151, rather than directly bending the display unit 151.

The guide information may be provided according to at least one of visual, audible, and tactile schemes. Here, the visual scheme may be a scheme of blinking an LED lamp or outputting information to the display unit, the audible scheme is a scheme of outputting information by voice, and the tactile scheme is a scheme of outputting information using vibration of the main body of the mobile terminal.

Figure 26B:
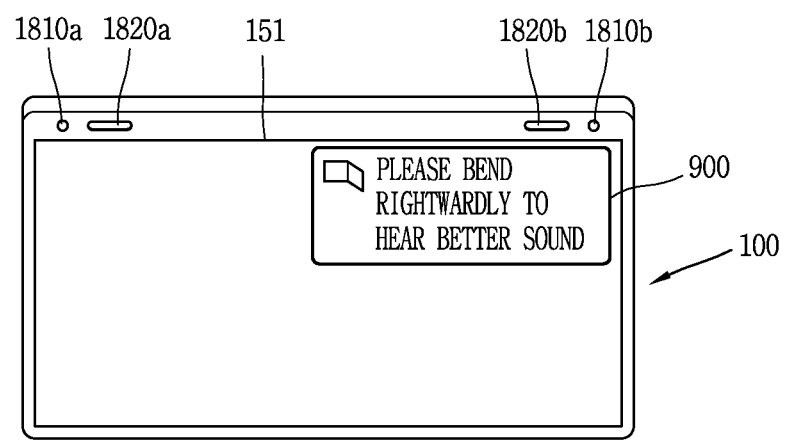

For example, as illustrated in FIG. 26B, the controller 180 may output information regarding changing a state of the display unit 151 on one region of the display unit 151. Here, the information regarding changing a state of the display unit 151 may include a direction in which the display unit 151 is bent, an angle at which the display unit 151 is bent, information regarding a bent surface, and the like.

Figure 26C:
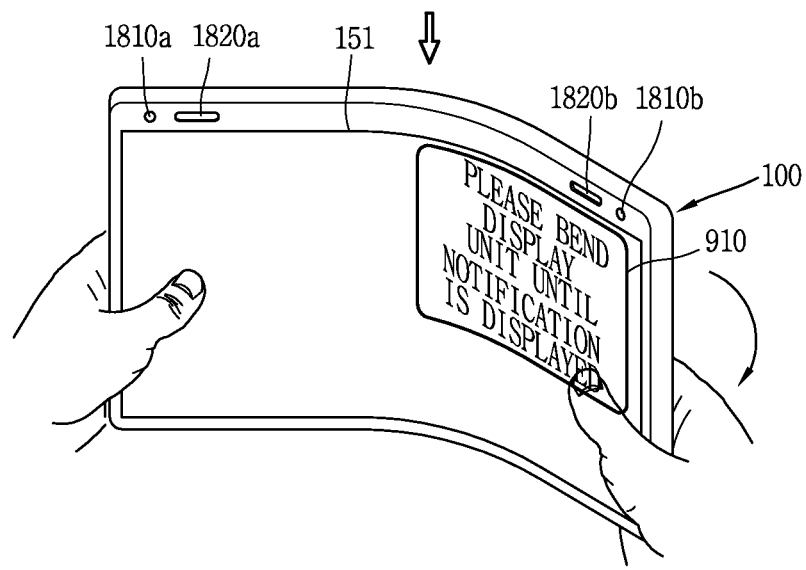

For example, guide information 2600 indicating a bending direction of the display unit 151 may be output on the display unit 151. In this case, as illustrated in FIG. 26C, the user may recognize the guide information 2600 and apply a force to the display unit 151 to bend the display unit 151.

In addition, the controller 180 may provide guide information 2610 to the user until the display unit 151 may be bent at the calculated degree of bending. For example, as illustrated in FIG. 26C, guide information 2610 causing the user to recognize a degree of bending may be output on the display unit 151.

Here, when a preset period of time has lapsed, the guide information 2610 may not be output any longer. Alternatively, when a state of the display unit 151 matches a state calculated by the controller 180 to transfer a sound to a transfer target of the sound, the guide information 2610 may not be output any longer.

Figure 27A:
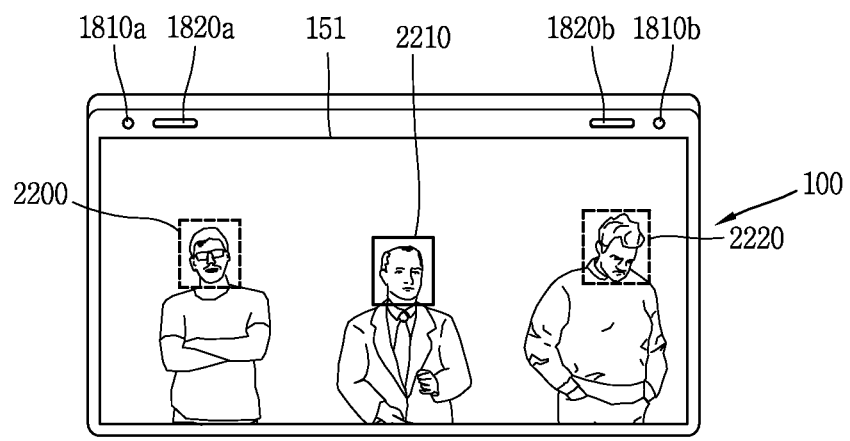

Also, as illustrated in FIG. 27A, the controller 180 may also output the guide information 2700 in a case of transferring a sound to a sound transfer target 2210 among a plurality of sound transfer targets 2200, 2210, and 2220.

Figure 27B:
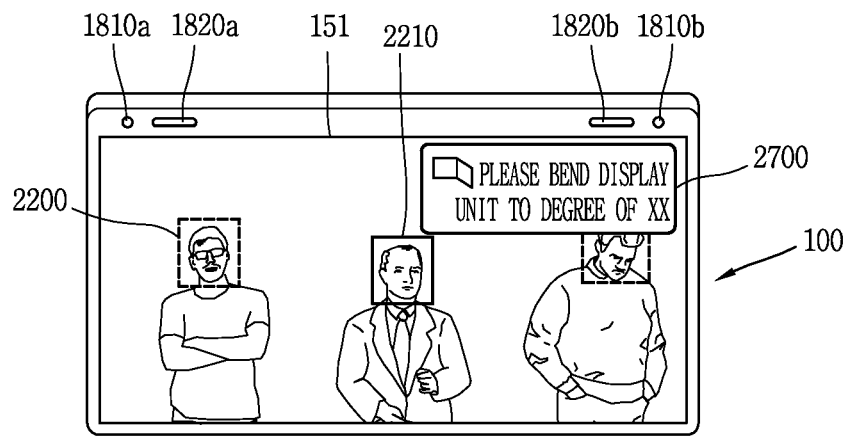

In this case, as illustrated in FIG. 27B, when a specific sound transfer target 2210 among the plurality of sound transfer targets 2200, 2210, and 2220, is determined, the controller 180 may calculate a bending angle of the display unit 151 such that the sound may be transferred to the specific sound transfer target 2210. Also, the controller 180 may output guide information 2710 indicating the bending angle to the display unit 151.

Figure 27C:
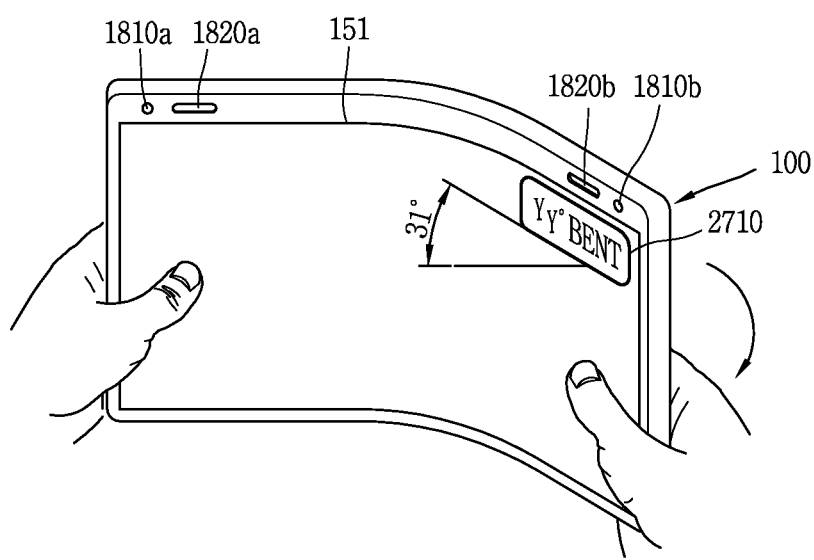

In addition, as illustrated in FIG. 27C, while the user is bending the display unit 151 by applying a force, guide information 2710 indicating a current degree of bending on the display unit 151. In this manner, the user may apply a force to the display unit 151, while checking a current degree of bending of the display unit 151.

In the present disclosure, an output direction of a sound of a directional speaker may be determined by utilizing bending characteristics of the display unit. In this manner, in the present disclosure, a sound may be transferred only to a specific person. In addition, transfer of a sound to a person other than the specific person may be prevented.

In addition, in the present disclosure, an output direction of a sound may be more simply controlled by utilizing bending characteristics of the display unit, even without performing controlling to change a position of a directional speaker.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The invention claimed is:

1. A mobile terminal comprising:
    a terminal body having a front surface, a rear surface, and a side surface, and flexibly formed such that a least a portion thereof is foldable;
    a display unit disposed on the front surface and including a first portion, and a second portion formed to be rotatable with respect to a boundary portion formed on one side of the first portion so as to be in a state in which the second portion covers the first portion or a state in which the second portion does not cover the first portion;
    a first sensing unit disposed on a left end of the terminal body and generating a first signal on the basis of a movement of the left end;
    a second sensing unit disposed on a right end of the terminal body and generating a second signal on the basis of a movement of the right end;
    a plurality of speakers disposed in at least one region of the front surface and the rear surface and capable of outputting sound;
    a plurality of cameras capturing an image of a transfer target of the sound; and
    a controller controlling at least one of functions executable on the terminal on the basis of the first signal and the second signal, wherein the controller is capable of:
        detecting a relative distance between the transfer target of the sound and the display unit based on the image;
        determining a radius of curvature of the display unit based on the detected relative distance and a position of the transfer target of the sound;
        bending the display unit such that the display unit has the determined radius of curvature;
        in response to detecting a plurality of targets from the image, setting any one of the plurality of targets as the transfer target according to a predetermined condition, the transfer target varying among the plurality of targets according to the predetermined condition;
        detecting the set transfer target's ear position using the image; and
        controlling the plurality of speakers to stop outputting the sound based on the detected ear position of the set transfer target in the image.

2. The mobile terminal of claim 1, wherein the controller calculates a degree of bending of the display unit with respect to the one boundary portion on the basis of the first signal and the second signal, and controls the at least one of the executable functions on the basis of the calculated degree of bending.

3. The mobile terminal of claim 2, wherein the calculated degree of bending is an included angle formed by the first portion and the second portion, and the included angle is variable based on a degree to which the first portion and the second portion relatively rotate with respect to the one boundary portion.

4. The mobile terminal of claim 3, wherein
an execution screen according to execution of an application is displayed on the display unit, and
the controller controls the display unit to output the execution screen according to the included angle according to different schemes.

5. The mobile terminal of claim 4, wherein
when the included angle is included in a first reference range, the controller controls the display unit to display the execution screen in the entire region including the first portion and the second portion,
when the included angle is included in a second reference range, the controller controls the display unit to display first and second execution screens corresponding to the execution screen respectively on the first portion and the second portion, and
when the included angle is included in a third reference range, the controller terminates displaying of the execution screen and switches the display unit from an activated state in which lighting is turned on to a deactivated state in which lighting is turned off.

6. The mobile terminal of claim 5, wherein the first execution screen is screen information obtained by horizontally reversing the second execution screen with respect to a direction in which the first portion is oriented.

7. The mobile terminal of claim 1, wherein the first portion and the second portion are formed to form a single plane.

8. The mobile terminal of claim 1, wherein
an execution screen according to execution of an application is displayed on the display unit, and
when a folding event occurs in the one boundary portion, the controller executes a first function related to the execution screen, and when a folding-back event occurs in the one boundary portion, the controller executes a second function related to the execution screen.

9. The mobile terminal of claim 1, wherein
the display unit displays screen information in a flat state, and
when the display unit is switched to a bent state with respect to the one boundary portion from the flat state, the controller controls the display unit to display a first screen and a second screen related to the screen information on the first portion and the second portion, respectively.

10. The mobile terminal of claim 9, wherein
the screen information, as an execution screen of a video play application, includes an image and graphic objects associated with controlling of the image, and
in response to a change in a state, the controller displays the first screen including the image and the second screen including the graphic objects, respectively on the first portion and the second portion.

11. The mobile terminal of claim 1, wherein
the display unit displays screen information in a flat state, and
when the display unit is switched from the flat state to a bent state with respect to the one boundary portion, the controller displays the screen information on any one of the first portion and the second portion and switches the other from an activated state in which lighting is turned on to a deactivated state in which lighting is turned off.

12. The mobile terminal of claim 11, wherein
when an event occurs in at least one application, while the screen information is being displayed on the any one,
the controller switches the other from the deactivated state to the activated state, and displays information related to the event on the remaining one which has been switched to the activated state.

13. The mobile terminal of claim 1, further comprising:
first and second cameras disposed at different points of the rear surface, and
when the display unit is switched from a flat state to a bent state with respect to the one boundary portion, the controller activates the first and second cameras.

14. The mobile terminal of claim 13, wherein
when the first and second cameras are activated, the controller displays a first preview screen captured by the first camera on the first portion, and displays a second preview screen captured by the second camera on the second portion.

15. The mobile terminal of claim 14, wherein
when an image capture command is received, the controller generates a first image captured by the first camera, a second image captured by the second camera, and a third image obtained by synthesizing the first and second images.

16. The mobile terminal of claim 12, wherein
when the first and second cameras are activated, the controller synthesizes a first image captured by the first camera and a second image captured by the second camera and displays the same on the entire region of the display unit.

17. The mobile terminal of claim 16, wherein
the controller identifies a subject included in the first and second images, and bends the display unit such that focuses of the first and second cameras are formed on the identified subject.

18. The mobile terminal of claim 17, wherein
when the identified subject is in plurality, the controller bends the display unit such that focus is formed on any one of the plurality of subjects.

19. The mobile terminal of claim 17, wherein
when a subject is not identified, the controller displays notification information indicating that there is no identified subject, in a region of the display unit.

20. The mobile terminal of claim 1, further comprising:
a front camera disposed on the front surface,
wherein the controller executes a first function or a second function on the basis of the first and second signals, and
the first function is a function of displaying an image captured by the front camera on the entire region of the display unit, and
the second function is a function of displaying an image captured by the front camera on each of the first portion and the second portion.

21. The mobile terminal of claim 1, wherein when the display unit is bent, sound output directions of the plurality of speakers are changed with respect to the transfer target of the sound according to an angle of the bent display unit.

22. The mobile terminal of claim 21, wherein
the sound output directions of the plurality of speakers are changed according to the angle of the bent display unit such that an output path of a sound output from the plurality of speakers is oriented to the transfer target of the sound.

23. The mobile terminal of claim 22, wherein
when the display unit is bent, an angle between the plurality of cameras is changed with respect to the transfer target of the sound according to the angle of the bent display unit.

24. The mobile terminal of claim 1, wherein the plurality of targets are received from the plurality of cameras.

25. The mobile terminal of claim 24, wherein
the controller bends the display unit such that the sound is transferred to the set target which matches a previously stored face image, among the plurality of targets received from the plurality of cameras.

26. The mobile terminal of claim 24, wherein
when the transfer target is set in response to a touch applied to one of the plurality of targets included in the displayed image, the controller bends the display unit such that the sound is transferred to the set target.

27. The mobile terminal of claim 1, wherein the transfer target's ear position is sensed through face recognition of the set transfer target.

28. The mobile terminal of claim 1, wherein
the plurality of speakers are disposed at both ends of the front surface, respectively.

29. The mobile terminal of claim 28, further comprising:
an object sensing unit sensing an object in the vicinity of the plurality of speakers,
wherein when an object present in a position adjacent to the plurality of speakers is sensed through the object sensing unit, the controller bends the display unit.

30. The mobile terminal of claim 1, wherein
when the transfer target of the sound is no longer detected from the image, the controller controls the plurality of speakers not to output the sound.

\* \* \* \* \*